(12) United States Patent
Cariou et al.

(10) Patent No.: US 10,366,064 B2
(45) Date of Patent: Jul. 30, 2019

(54) BASIC SERVICE SET IDENTIFICATIONS FOR USING NON-DEFAULT SPATIAL REUSE PARAMETERS

(71) Applicant: Intel IP Corporation, Santa Clara, CA (US)

(72) Inventors: Laurent Cariou, Portland, OR (US);
Po-Kai Huang, San Jose, CA (US);
Daniel F. Bravo, Hillsboro, OR (US);
Noam Ginsburg, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 45 days.

(21) Appl. No.: 15/598,907

(22) Filed: May 18, 2017

(65) Prior Publication Data
US 2017/0255659 A1    Sep. 7, 2017

Related U.S. Application Data

(63) Continuation-in-part of application No. 15/192,433, filed on Jun. 24, 2016.

(60) Provisional application No. 62/381,254, filed on Aug. 30, 2016, provisional application No. 62/289,119, filed on Jan. 29, 2016.

(51) Int. Cl.
*H04W 84/12* (2009.01)
*G06F 16/22* (2019.01)
*G09G 5/393* (2006.01)
*H04B 7/0413* (2017.01)

(52) U.S. Cl.
CPC ......... *G06F 16/2237* (2019.01); *G09G 5/393* (2013.01); *H04B 7/0413* (2013.01); *H04W 84/12* (2013.01)

(58) Field of Classification Search
CPC ....... H04B 7/04; H04B 7/0413; H04L 69/322; H04W 52/26; H04W 84/12
See application file for complete search history.

(56) References Cited

U.S. PATENT DOCUMENTS

2017/0105217 A1* 4/2017 Kwon .................. H04B 17/318

* cited by examiner

*Primary Examiner* — Asad M Nawaz
*Assistant Examiner* — Zhaohui Yang
(74) *Attorney, Agent, or Firm* — Schwegman Lundberg & Woessner, P.A.

(57) ABSTRACT

Apparatuses, methods, computer readable media for basic service set (BSS) identifications for using non-default spatial reuse parameters. An apparatus including memory configured to store one or more bitmaps including at least one of a spatial reuse (SR) group (SRG) basic service set (BSS) color bitmap and a SRG Partial BSS identification (ID) (BSSID) Bitmap, and processing circuitry configured to: decode an inter-BSS physical layer convergence procedure (PLCP) protocol data unit (PPDU). The processing circuitry may be further configured to determine the inter-BSS PPDU to be a SRG PPDU if: the inter-BSS PPDU comprises a BSS color field and a bit of the SRG BSS color bitmap corresponding to a value of the BSS color field is set; or a BSSID field is identified for the inter-BSS PPDU, and a bit of the SRG Partial BSSID bitmap corresponding to a value of a partial BSSID of the BSSID is set.

22 Claims, 21 Drawing Sheets

1600 SR PARAMETERS

| SRG OBSS TX MAX | SRG OBSS PD MIN | SRG OBSS PD MAX | SRG BSS COLOR BITMAP | SRG PARTIAL BSSID BITMAP |
|---|---|---|---|---|
| 1652 | 1654 | 1656 | 1658 | 1660 |

FIG. 16

| ELEMENT ID 1702 | LENGTH 1704 | NON SRG OBSS PD MAX OFFSET 1710 | SRG OBSS PD MIN OFFSET 1712 | SRG OBSS PD MAX OFFSET 1714 | SRG BSS COLOR BITMAP 1716 | SRG PARTIAL BSSID BITMAP 1718 |

1700 — SR PARAMETERS

FIG. 17

BASIC SERVICE SET IDENTIFICATIONS FOR USING NON-DEFAULT SPATIAL REUSE PARAMETERS

PRIORITY CLAIM

This application claims the benefit of priority under 35 USC 119(e) to U.S. Provisional Patent Application Ser. No. 62/381,254, filed Aug. 30, 2016, and U.S. Provisional Patent Application Ser. No. 62/289,118, filed Jan. 29, 2016, both of which are incorporated herein by reference in their entirety.

This application claims the benefit of priority under 35 USC 120 to U.S. patent application Ser. No. 15/192,433, filed Jun. 24, 2016, which claims the benefit of priority under 35 USC 119(e) to U.S. Provisional Patent Application Ser. No. 62/289,118, filed Jan. 29, 2016, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax communication standard. Some embodiments relate to methods, computer readable media, and apparatus for basic service set (BSS) identifications (IDS) for using non-default spatial reuse (SR) parameters.

BACKGROUND

Efficient use of the resources of a wireless local-area network (WLAN) is important to provide bandwidth and acceptable response times to the users of the VLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 16 illustrates SR parameters in accordance with some embodiments;

FIG. 17 illustrates SR parameters in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
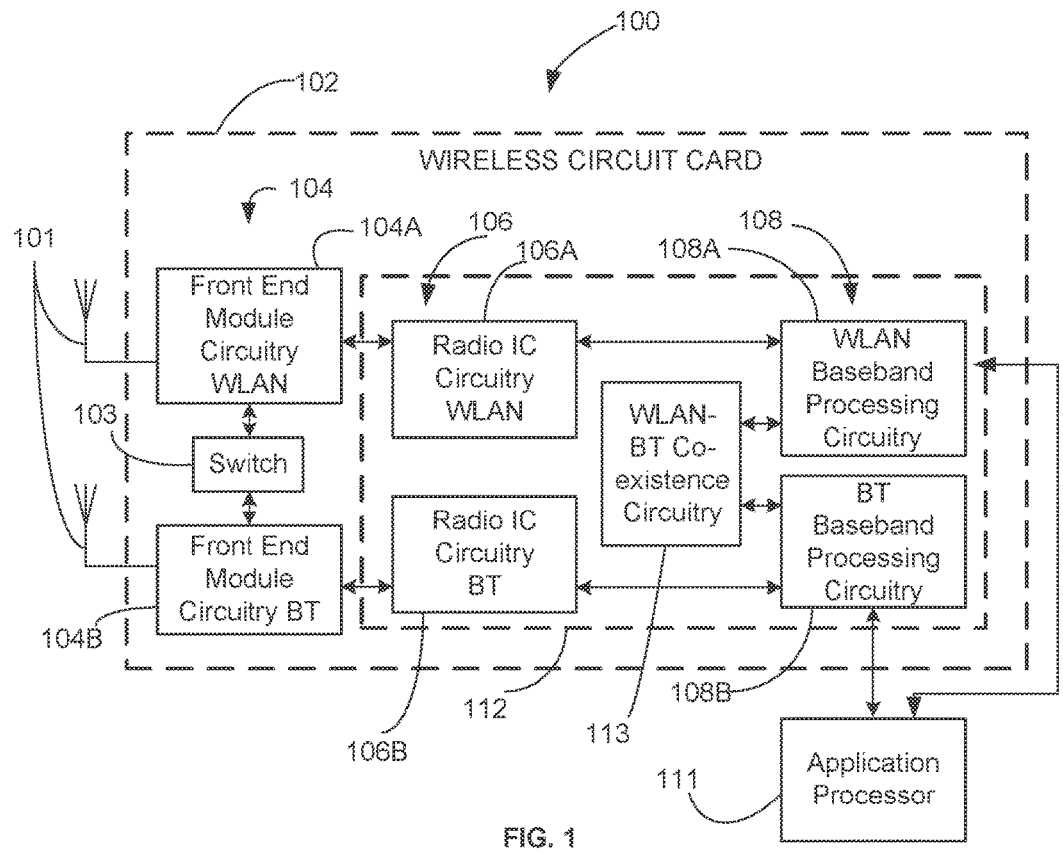
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104a and a Bluetooth (BT) FEM circuitry 104b. The WLAN FEM circuitry 104a may include a receive signal path comprising circuitry configured to operate on WLAN RF signals received from one or more antennas 101, to amplify the received signals and to provide the amplified versions of the received signals to the WLAN radio IC circuitry 106a for further processing. The BT FEM circuitry 104b may include a receive signal path which may include circuitry configured to operate on BT RF signals received from one or more antennas 101, to amplify the received signals and to provide the amplified versions of the received signals to the BT radio IC circuitry 106b for further processing. FEM circuitry 104a may also include a transmit signal path which may include circuitry configured to amplify WLAN signals provided by the radio IC circuitry 106a for wireless transmission by one or more of the antennas 101. In addition, FEM circuitry 104b may also include a transmit signal path which may include circuitry configured to amplify BT signals provided by the radio IC circuitry 106b for wireless transmission by the one or more antennas. In the embodiment of FIG. 1, although FEM 104a and FEM 104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106a and BT radio IC circuitry 106b. The WLAN radio IC circuitry 106a may include a receive signal path which may include circuitry to down-convert WLAN RF signals received from the FEM circuitry 104a and provide baseband signals to WLAN baseband processing circuitry 108a. BT radio IC circuitry 106b may in turn include a receive signal path which may include circuitry to down-convert BT RF signals received from the FEM circuitry 104b and provide baseband signals to BT baseband processing circuitry 108b. WLAN radio IC circuitry 106a may also include a transmit signal path which may include circuitry to up-convert WLAN baseband signals provided by the WLAN baseband processing circuitry 108a and provide WLAN RF output signals in the FEM circuitry 104a for subsequent wireless transmission by the one or more antennas 101. BT radio IC circuitry 106b may also include a transmit signal path which may include circuitry to up-convert BT baseband signals provided by the BT baseband processing circuitry 108b and provide BT RF output signals to the FEM circuitry 104b for subsequent wireless transmission by the one or more antennas 101. In the embodiment of FIG. 1, although radio IC circuitries 106a and 106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108a and a BT baseband processing circuitry 108b. The WLAN baseband processing circuitry 108a may include a memory, such as, for example, a set of RAM arrays in a Fast Fourier Transform or Inverse Fast Fourier Transform block (not shown) of the WLAN baseband processing circuitry 108a. Each of the WLAN baseband circuitry 108a and the BT baseband circuitry 108b may further include one or more processors and control logic to process the signals received from the corresponding WLAN or BT receive signal path of the radio IC circuitry 106, and to also generate corresponding WLAN stir BT baseband signals for the transmit signal path of the radio IC circuitry 106. Each of the baseband processing circuitries 108a and 108b may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108a and the BT baseband circuitry 108b to enable use cases requiring WLAN and BT coexistence. In addition, a switch 103 may be provided between the WLAN FEM circuitry 104a and the BT FEM circuitry 104b to allow switching between the WLAN and BT radios according to application needs. In addition, although the antennas 101 are depicted as being respectively connected to the WLAN FEM circuitry 104a and the BT FEM circuitry 104b, embodiments include within their scope the sharing of one or more antennas as between the WLAN and BT FEMs, or the provision of more than one antenna connected to each of FEM 104a or 104b.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency Wi-Fi (HEW) communications in accordance with the IEEE 802.11ax communication standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108*b* may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
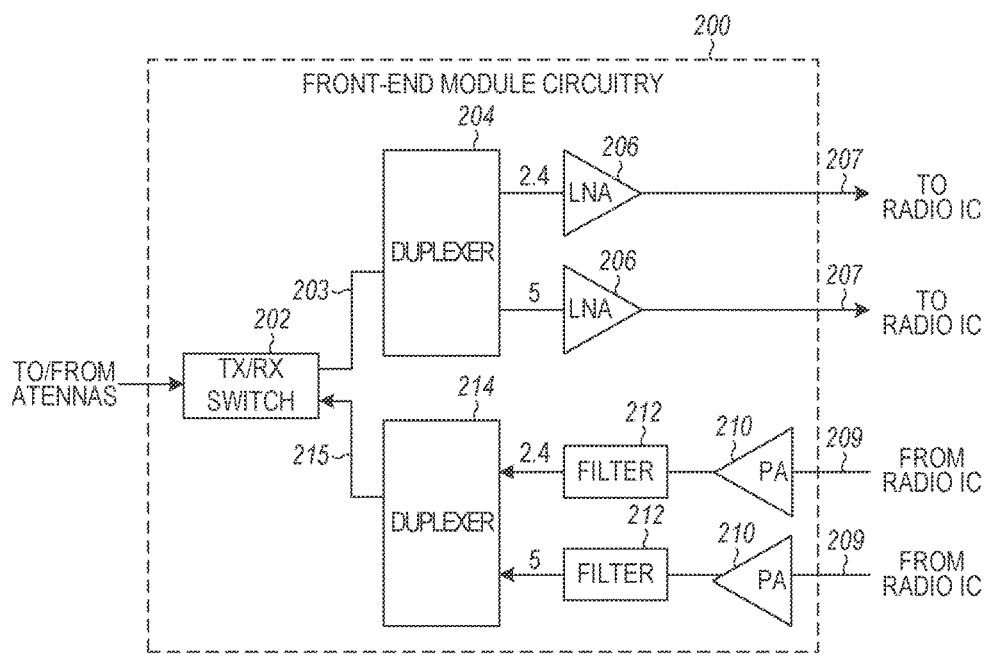
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104*a*/104*b* (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received. RF signals 207 as an output (e.g., to the radio IC circuitry 106 (FIG. 1)). The transmit signal path of the circuitry 200 may include a power amplifier (PA) 210 to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
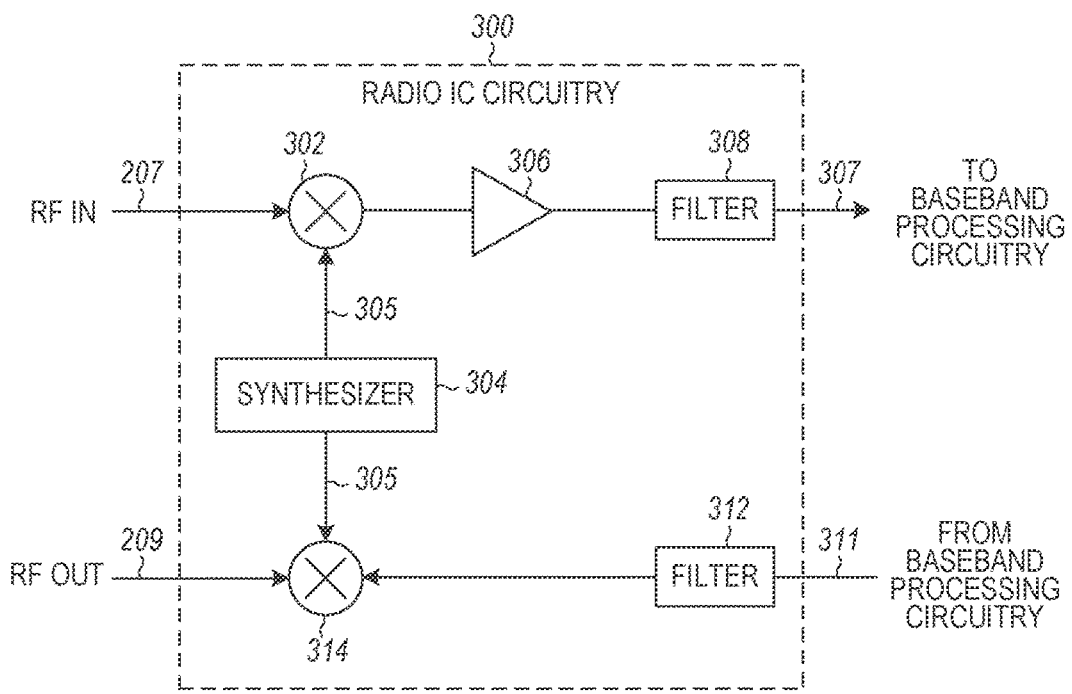
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106*a*/106*b* (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 302 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q paths). In such an embodiment, RF input signal 207 from FIG. 3 may be down-converted to provide I and Q baseband output signals to be sent to the baseband processor Quadrature passive mixers may be driven by zero and ninety degree time-varying local oscillator (LO) switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
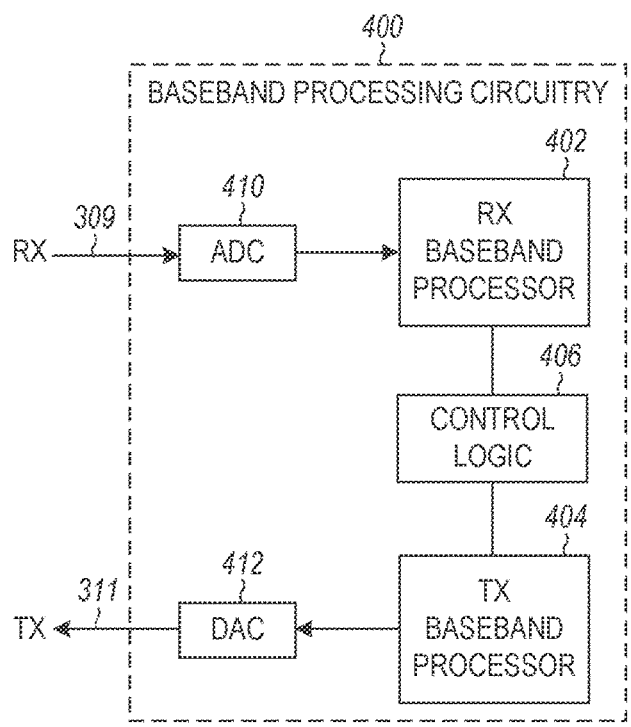
FIG. 4 illustrates a baseband processing circuitry for use in the radio architecture of FIG. 1 in accordance with some embodiments.

FIG. 4 illustrates a functional block diagram of baseband processing circuitry 400 in accordance with sonic embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
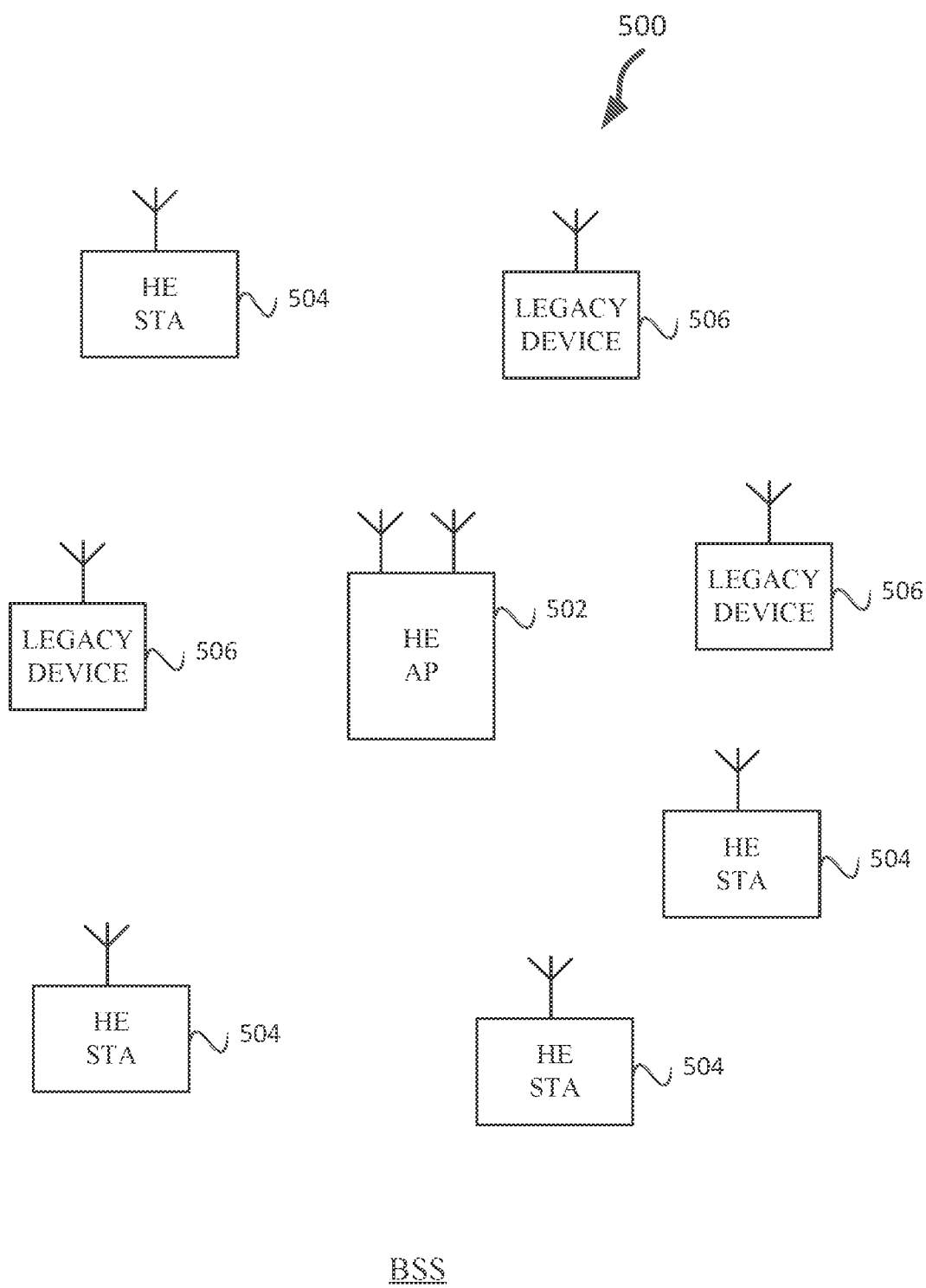
FIG. 5 illustrates a WLAN in accordance with some embodiments.

FIG. 5 illustrates a WLAN 500 in accordance with some embodiments. The WLAN 500 may comprise a basis service set (BSS) 500 that may include a HE AP 502, which may be an AP, a plurality of high-efficiency wireless (e.g., IEEE 802.11ax communication standard) (HE) stations (STAs) (HE-STA) 504, and a plurality of legacy (e.g., IEEE 802.11n/ac communication standards) devices 506.

In some embodiments, a HE STA 504 may operate in part or in whole as an HE AP 502. In some embodiments, the term HE AP STA may refer to an HE AP 502. In some embodiments, a HE non-AP STA may refer to a HE non-AP or HE STA 504. In some embodiments, HE STA 504 may refer to both HE AP STA and HE non-AP STA.

The HE AP 502 may be an AP using the IEEE 802.11 communication protocol to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIM0). There may be more than one HE AP 502 that is part of an extended service set (ESS). A management entity 604 (see FIG. 6) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a PPDU. In some embodiments, there may be different types of PPDUs that may have different fields and different physical layers and/or different MAC layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM). Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a AP which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy devices 506 (e.g., legacy stations) refrain from communicating. The legacy devices 506 may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy devices 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 504 or an HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, HE stations 504, HE APs 502, apparatuses of the HE stations 504, and/or apparatuses of the HE AP 502 may include one or snore of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and functions herein described in conjunction with FIGS. 1-23.

In example embodiments, the HE station 504 and/or the HE AP 502 are configured to perform the methods and functions described herein in conjunction with FIGS. 1-23. In example embodiments, an apparatus of the HE station 504 and/or an apparatus of the HE AP 502 are configured to perform the methods and functions described herein in conjunction with FIGS. 1-23. The term. Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments. HE STA 504 may be referred to as either a HE AP STA or a HE non-AP.

Figure 6:
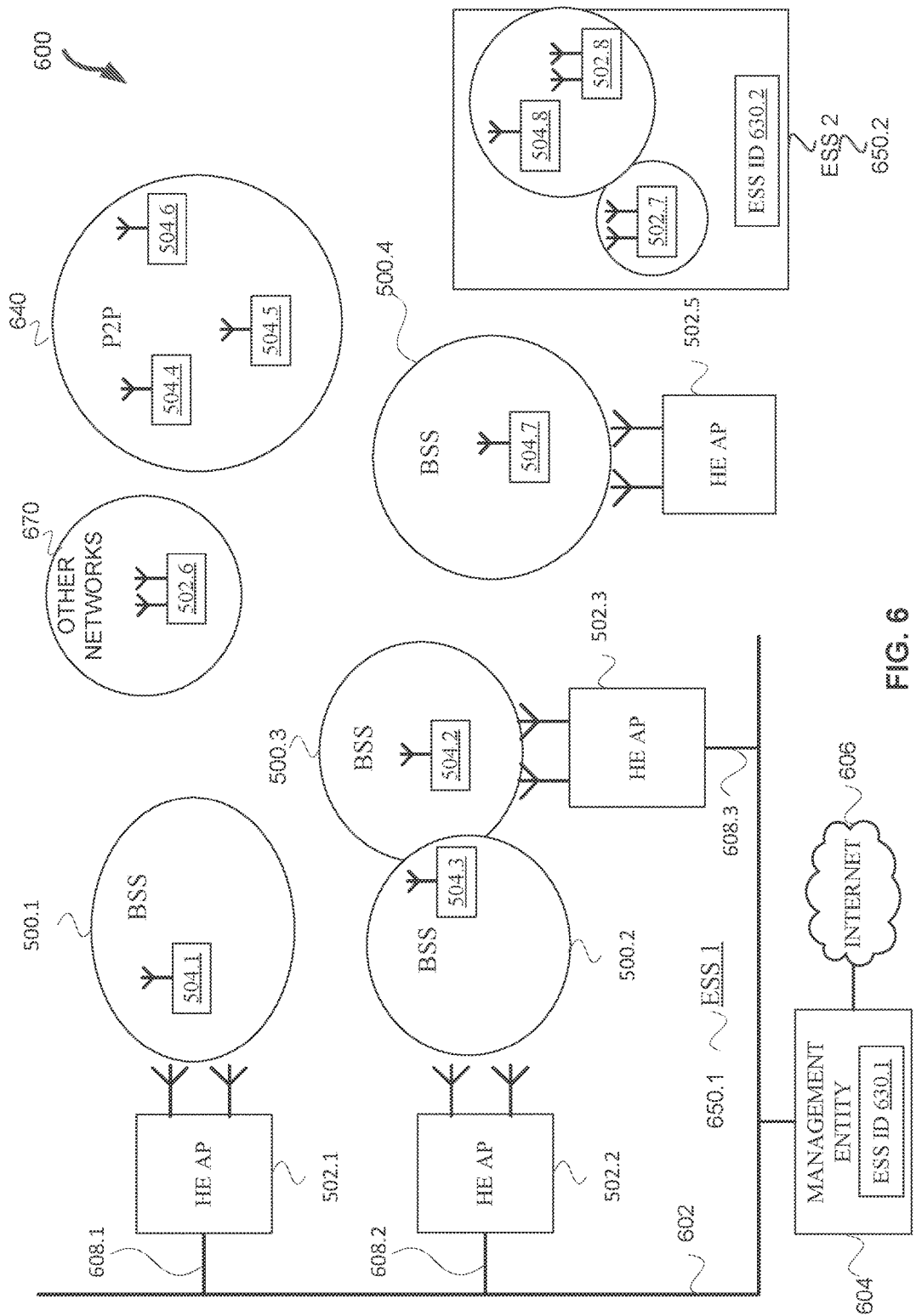
FIG. 6 illustrates a wireless network in accordance with some embodiments.

FIG. 6 illustrates a wireless network 600 in accordance with some embodiments. Illustrated in FIG. 6 is ESS 1 650.1, other networks 670, BSS 500.4, ESS 2 650.2, APs 502, management entity 604, Internet 606, and peer-to-peer (P2P) network 640. In some embodiments, the wireless network 600 represents different networks that are available in a high density area such as a football stadium.

A SR group (SRG) may be portions of the wireless network 600 that may use one set of SR parameters (e.g., 710, 1200, 1600, 1700) for PPDUs (e.g., 700) from access points 502 and HE stations 504 within the SRG, and another set of SR parameters (e.g., non-SRG parameters 810, 910, 1010, 1210) for PPDUs (e.g., 700) from access points 502 and HE stations 504 that are not part of the SRG. A management domain may be a portion of the wireless network 600 that is managed by a same management entity 604.

The ESS 1 650.1 comprises three BSSs 500.1, 500.2, and 500.3. The APs 502.1, 502.2, and 502.3 are part of their respective BSSs 500.1, 500.2, and 500.3. The APs 502 are coupled to a distribution system (DS) 602 through communication links 608.1, 608.2, and 608.3. The DS 602 may be any technology that provides the appropriate services to the ESS 650.1. For example, the DS 602 may be Ethernet cables or wireless connections. The communication links 608 may be cables or wireless links. The BSSs 500 may include additional APs 502, HE stations 504, and/or legacy devices 506.

The management entity 604 may be a router that routes packets based on destination addresses. The management entity 604 may include functionality for managing ESS 1 650.1 such as setting SR parameters (or a portion of SR parameters) 710, 802, 902, 1002, 1200, 1600, 1700. The management entity 604 may transmit SR parameters (or a portion of SR parameters) 710, 1200, 1600, 1700, 802, 902, 1002, 1202, 810, 910, 1010, 1210, to one or more of the HE APs 502.1, 502.2, 502.3, and/or HE devices 504 that are part of the BSSs 500.1, 500.2, and 500.3. The management entity 604 may transmit SR parameters (or a portion of SR parameters) 710, 802, 902, 1002, 1200, 1600, 1700, to devices the management entity 604 is managing such as the wireless devices (e.g., HE AP 502.1, 502.2, and 502.3, and HE station 504.1, 504.2, and 504.3) that are part of the ESS 1 650.1. In some embodiments, the management entity 604 or different portions of the management entity 604 may reside on different devices, e.g., one of the HE APs 502, a router, a device in the Internet 606, a server, etc. In some embodiments, the management entity 604 may manage additional networks such as other networks 670.

The internet 606 may be an interconnected network such as the Internet. The HE APs 502.1, 502.2, and 502.3, each have a basic service set identifier (BSSID) (e.g., 704 of FIG. 7 or 1006 of FIG. 10). In some embodiments, the BSSIDs (e.g., 704, 906 1006) are assigned to the HE APs 502.1, 502.2, and 502.3 from the management entity 604. In some embodiments, management entity 604 may generate BSSIDs (e.g., 704 906, 1006) for HE APs 502 that are part of the same management domain, ESS 605, and/or SRG. In some embodiments, management entity 604 may generate BSSIDs (e.g., 704, 1006) for HE APs 502 that are part of the same management domain, ESS 650, or SRG, so that the BSSIDs (e.g., 704, 906, 1006) have consecutive numbers, e.g., see FIG. 15 and the accompanying text. In some embodiments, management entity 604 may generate BSSIDs (e.g., 704, 906, 1006) for HE APs 502 that are part of the same management domain, ESS 650, and/or SRG so that the BSSIDs (e.g., 704, 906, 1006) have a range of bits of the BSSID (e.g., 704, 1006) that are the same, where the bits that are not the same can be used to differentiate the BSSIDs (e.g., 704, 906, 1006) from one another, and the bits that are the same can be used to identify the group of BSSIDs (e.g., 704, 906, 1006) that are all part of the same management domain, ESS 605, and/or SRG, e.g., see FIG. 15 and the accompanying text.

In some embodiments, the HE APs 502.1, 502.2, and 502.3 generate a BSSID) (e.g., 704, 1006). In some embodiments, the BSSIDs (e.g., 704, 906, 1006) are assigned to the HE AP 502 by a manufacturer.

In some embodiments, the HE APs 502.1, 502.2, and 502.3, each have a BSS color (e.g., 702, 904, or 1004). In some embodiments, the BSS color 702 is assigned to the HE APs 502.1, 502.2, and 502.3 from the management entity 604. In some embodiments, the HE APs 502.1, 502.2, and 502.3 generate a BSS color (e.g., 702, 904, or 1004).

In some embodiments the management entity 604 may manage BSS colors (e.g., 702, 904, or 1004) that are part of the same management domain, ESS 650, or SRG. For example, the management entity 604 may assign BSS colors (e.g., 702, 904, or 1004) to HE AP 502. In some embodiments, the management entity 604 will maintain a data structure of the BSS colors (e.g., 702, 904, or 1004) that are part of the same management domain, ESS 650, and/or SRG. For example, the management entity 604 may maintain a SRG BSS color bitmap 1302, SRG BSS colors 812, 912. 1012, or another data structure to indicate which BSS colors are part of the same management domain, ESS 650, and/or SRG.

The BSSs 500.1, BSS 500.2, and BSS 500.3 may overlap with one another. A BSS 500 that overlaps another BSS 500 may be termed an OBSS the other BSS 500. For example, BSS 500.2 and BSS 500.3 overlap, which means signals from the BSS 500.2 would reach one or more wireless devices (HE STA 504, legacy device 506, and/or HE AP 502) that are part of the BSS 500.3, e.g. the HE AP 502.3 or HE station 504.2. For example, a PPDU (e.g., 700) may be transmitted by HE AP 502.3 and be received by HE station 504.3. The PPDU (e.g., 700) may be termed a PPDU (e.g., 700) from an OBSS, where the OBSS is within the same management domain. SRG, and/or ESS 650. A PPDU (e.g., 700) that is not from the same BSS 500 as the wireless device (HE STA 504, legacy device 506, and/or HE AP 502) that receives the PPDU (e.g., 700) may be termed an inter-BSS PPDU 700). A PPDU (e.g., 700) that is from the same BSS 500 as the wireless device (HE STA 504, legacy device 506, and/or HE AP 502) may be termed an intra-BSS PPDU (e.g., 700).

In accordance with some embodiments, HE APs 502 that are part of the same ESS 650 may be termed neighbor access points to other HE APs 502 of the same ESS 650. In accordance with some embodiments, HE APs 502 that are part of the same ESS 650 may be considered as part of the same SRG. For example, HE AP 502.1, 502.2, and 502.3, may all be part of the same management domain, ESS 650.1, and, thus, in some embodiments, all part of the same SRG.

For example, HE AP 502.1 is in the same SRG as HE APs 502.2, and 5023. In accordance with some embodiments, HE APs 502 may send information regarding the HE AP 502 and BSS 500 to neighbor HE APs 502 or HE APs 502 that are part of the same SRG. The HE APs 502 may be configured to operate on different primary channels, which in some embodiments may be coordinated or facilitated (e.g., via message passing) by the management entity 604 and/or by messaging between neighboring HE APs 502 and/or HE APs that are part of the same SRG.

BSS 500.4 may not be part of ESS 1 650.1 or ESS 2 650.2. In some embodiments, HE AP 502.5 may be termed an unmanaged HE AP because it may not be part of a management entity (e.g., management entity 604). In some embodiments signals (e.g., PPDU 700) from wireless devices of ESS 1 650.1, ESS 2 650.2, BSS 500.4, P2P network 640, and/or other networks 670 may reach one or more of the following BSSs 500 of ESS 1 650.1, ESS 2 650.2, other networks 670, and/or P2P network 640. For example, PPDUs (e.g., 700 that are beacons) from HE AP 502.7 of ESS 2 650.2 may reach HE station 504.1 of BSS 500.1 of ESS 1 650.1. In some embodiments, the HE APs 502 and/or HE stations 504 may be configured to determine if a PPDU 700 is from a neighboring HE AP 502. In some embodiments, the HE APs 502 and/or HE stations 504 may be configured to determine if a PPDU (e.g., 700) is from an HE AP 502 or HE station 504 in their management domain, ESS 650, and/or SING, e.g., using BSSIDs (e.g., 704, 1006) or BSS colors (e.g., 702, 904, or 1004). In some embodiments, the HE APs 502 and/or HE stations 504 may be configured to determine if a PPDU (e.g., 700) is an inter-BSS PPDU (e.g., 700) or an intra-BSS PPDU (e.g., 700).

Other networks 670 may be other networks that generate signals. For example, other networks 670 may be a Long-Term Evolution (LTE) license assisted access (LAA). P2P network 640 may be a network of HE stations 504 where one or more HE stations 504 are using P2P to communicate and/or one or more of the HE station 504 are operating (e.g, acting as a GO) as APs (e.g., HE AP 502). In some embodiments, the HE stations 504, acting as an HE AP 502, with at least some of the functionality of the HE AP 502, may be termed soft HE APs. ESS 2 650.2 may be similar or the same as ESS 1 650.1. In some embodiments ESS 1 650.1 and ESS 2 650.2 may communicate with one another, e.g. management entity 604 may communicate with a management entity (not illustrated) of ESS 2 650.2, or ESS 1 650.1 and ESS 2 650.2 may have a common management entity (not illustrated), e.g., there may be a common management entity reachable by both ESS 1 650.1 and ESS 2 650.2.

In some embodiments, the HE station 504.4 and/or an HE AP 502 may use the ESS ID 630.1 of ESS 650.1 (e.g., ESS ID 918, 1018). The HE APs 502 may transmit SR parameters (or a portion of SR parameters) (e.g., 710, 1200, 1600, 1700, 802, 902, 1002, 1202, 810, 910, 1010, 1210), in beacon frames, pre-association frames, probe responses, and/or association (or re-association) requests, in accordance with some embodiments. The HE APs 502 may receive the SR parameters (or a portion of SR parameters) (e.g., 710, 1200, 1600, 1700, 802, 902, 1002, 1202, 810, 910, 1010, 1210), from a management entity 604 and then transmit them to HE stations 504.

In some embodiments, the HE AP 502 and/or HE stations 504 may be configured to determine if a frame is from a wireless device from a different management entity 604 based on the ESS ID 630.

The HE stations 504 may be configured to forward frames (e.g., PPDU 700) from other management entities. For example, HE station 504.7 may forward a beacon with the SR parameters (or a portion of SR parameters) (e.g., 710, 1200, 1600, 1700, 802, 902, 1002, 1202, 810, 910, 1010, 1210), being used by ESS 1 630.1 to the HE AP 502.5 that the HE station 504.7 is associated with.

In some embodiments, if an HE AP 502 and/or HE STA 504 receives a frame (e.g., PPDU 700) from a different management entity 604 (e.g., a management entity (not illustrated) of ESS 630), then the HE AP 502 may switch to default parameters for the SR parameters (or a portion of SR parameters) (e.g., 710, 1200, 1600, 1700, 802, 902, 1002, 1202, 810, 910, 1010, 1210).

In some embodiments, whether SR can be used may be turned on or off, e.g., a field to indicate if SR may be used. In some embodiments, this may be managed by the management entity 604 and/or HE APs 502. In some embodiments, whether SR parameters (e.g., 802, 902, 1002, 1202) may be used for inter-BSS PPDUs (e.g., 700) from the same management entity, SRG, and/or ESS 650, may be configurable, e.g., a field to indicate that SRG parameters (e.g., 802, 902, 1002 1202) may or may not be used. In some embodiments, if SR may be used, and SRG parameters (e.g., 802, 902, 1002, 1202) may not be used (e.g., not permitted or the PPDU is not an inter-BSS PPDU from the same management entity, SRG, and/or ESS 650) another set of SR parameters (e.g., non-SRG parameters 810, 910, 1010, 1210) may be used.

HE APs 502 may ignore OBSS beacons from the same managed entity, in accordance with some embodiments. This avoids one modification to an HE AP 502 of a management entity propagating to all the other HE AP 502 of the management entity, e.g., HE AP 502.2 may ignore beacons or not be responsive to beacons from HE AP 502.3.

In some embodiments, the HE STAs 504 and/or HE APs 502 may be configured to classify PPDUs (e.g., 700) as inter PPDUs, unclassified PPDUs, and intra PPDUs. In some embodiments, the HE STA 504 and/or HE AP 502 may be configured to perform SR only when the PPDU is classified as an inter-BSS PPDU. In some embodiments, the HE STA 504 and/or HE AP 502 may be configured to perform SR only when the PPDU is classified as a unclassified PPDU or an inter-BSS PPDU. A PPDU (e.g., 700) may be unclassified because the PPDU may not include enough information to classify the PPDU (e.g., the PPDU may only include a receiver address.)

Figure 7:
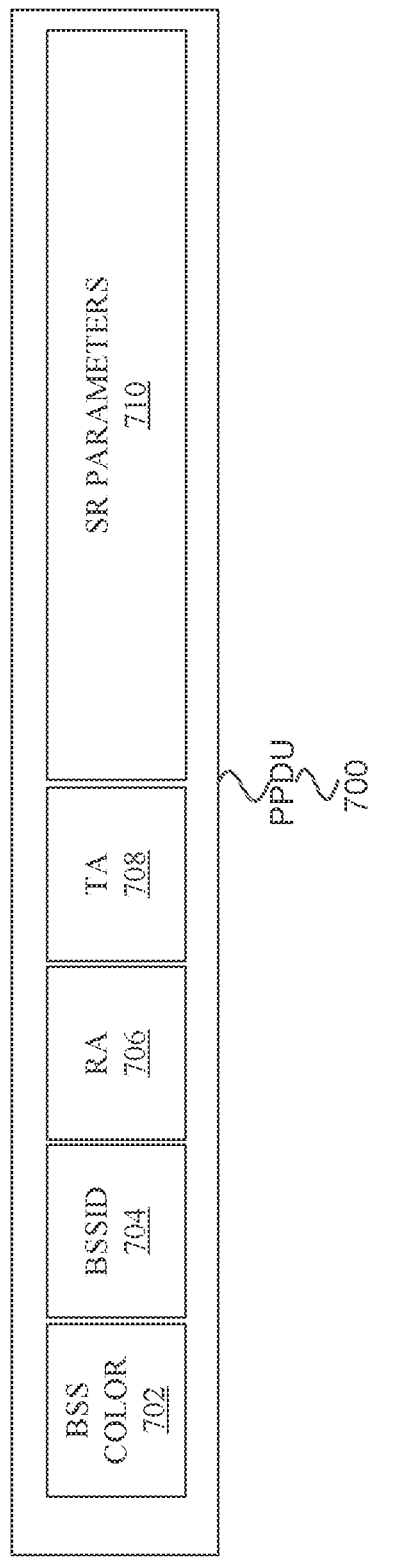
FIG. 7 illustrates a physical Layer Convergence Procedure (PLCP) Protocol Data. Unit (PPDU) in accordance with some embodiments.

FIG. 7 illustrates a physical Layer Convergence Procedure (PLCP) Protocol Data Unit (PPDU) 700 in accordance with some embodiments. The PPDU 700 includes one or more of a BSS color 702, a BSSID 704, a receiver address (RA) 706, a transmitter address (TA) 708, and SR parameters 710. In some embodiments, the PPDU 700 is a HE PPDU that is generated to comply with the IEEE 802.11ax communication standard.

The BSS color 702 field (e.g., 904, 1004) may be an identifier of a BSS 500. The BSS color 702 field may be used to assist in identifying a BSS 500 from which the PPDU 700 originates. In some embodiments, the BSS color 702 field is a value between one and 63. In some embodiments, the BSS color 702 field is six bits. In some embodiments, the BSS color 702 field is a field in an HE signal (HE SIG) field in a HE preamble (not illustrated) of the PPDU 700.

The BSSID 704 field (e.g., 1006) may be a BSSID. In some embodiments the BSSID 704 is the MAC addresses of the HE APs 502.1, 502.2, and 502.3 generated by combining a 24 bit Organization Unique Identifier (the manufacturer's identity) and the manufacturer's assigned 24-bit identifier for the radio chipset in the HE AP 502. In some embodiments the BSSID 704 is a 48 bit MAC address in accordance with IEEE 802.11. The BSSID 704 may be generated by a management entity 650, HE AP 502 or another device.

The RA 706 may be an address that indicates the receiver of the PPDU 700. The TA 708 may be an address that indicates the transmitter of the PPDU 700. In some embodiments, the RA 706 and. TA 708 are generated by the HE AP 502 and/or HE station 504 in accordance with the IEEE 802.11ax communication standard.

In some embodiments, the SR parameters 710 may be an information element (ID) that is carried by the PPDU 700. In some embodiments, the SR parameters 710 may be fields of the PPDU 700. The SR parameters (or a portion of SR parameters) 710 (e.g., 710, 1200, 1600, 1700, 802, 902, 1002, 1202, 810, 910, 1010, 1210) may include one or more of the fields described herein.

Figure 8:
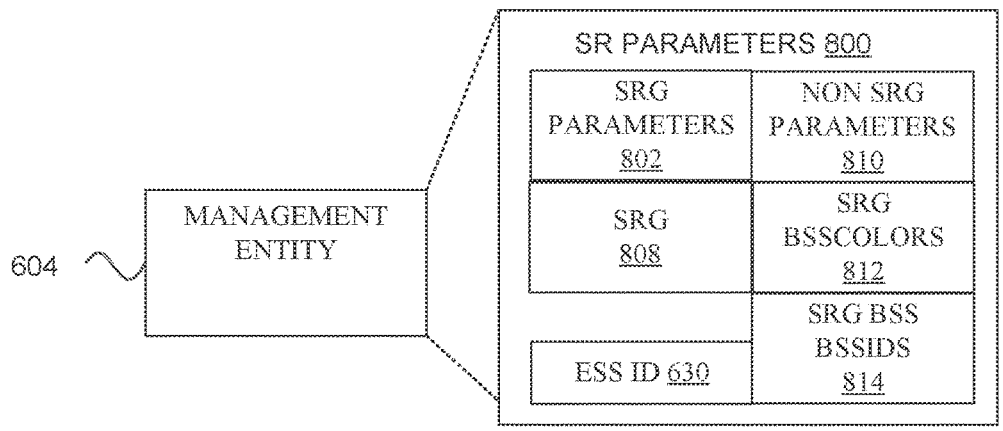
FIG. 8 illustrates a management entity in accordance with some embodiments.

FIG. 8 illustrates a management entity 604 in accordance with some embodiments. The management entity 604 may include one or more of an SRG parameters 802, non SRG parameters 810, SRG BSS colors 812, SRG BSSIDS 814, and ESS ID 630.

SRG parameters 802 (802, 902, 1002, 1202) may be parameters for HE AP 502 and/or HE stations 504 to use for determining whether to use SR for inter-BSS PPDUs 700 that are part of a same management domain, SRG 808, and/or ESS 650. For example, SRG parameters 802 may include an indication of an OBSS_PDMAX 1106 (see FIG. 11), OBSS_PDMIN 1108, a maximum TXP 1102, and/or a slope of line 1110 (e.g., one or more of the fields of SR parameters 1600 and/or SR parameters 1700).

In some embodiments, the management entity 604, HE AP 502, and/or HE STA 504 acting as an AP may be configured to coordinate the generation of SR parameters 802 for multiple ESSs 650, e.g., ESS 1 650.1 and ESS 2 650.2 may be in a same physical location such as a stadium and the management entity 604 may determine SR parameters 802 for both ESSs 650. In some embodiments, the management entity 604 and/or HE AP 502 determine the SR parameters 802 for each ESS 650 to improve the throughput of the combined network 600 or to improve the throughput of the ESSs 650 managed by the management entity 604. In some embodiments, the IEEE 802.11 communication standard (e.g., 802.11ax) may include default values for the SRG parameters 802.

Non SRG parameters 810 may be parameters for HE APs 502 and/or HE stations 504 to use for determining whether to use SR for inter-BSS PPDUs 700 that are not part of a same management domain, SRG 808, and/or ESS 650. For example, Non SRG parameters 810 may include an indication of an OBSS_PD max 1106 (see FIG. 11), OBSS_PD-MIN 1108, a maximum TXP 1102, and/or a slope of line 1110 (e.g., one or more of the fields of SR parameters 1600 and/or SR parameters 1700).

In some embodiments, the management entity 604 and/or HE AP 502 may be configured to coordinate the generation of Non SR parameters 810 for multiple ESSs 650. For example, ESS 1 650.1 and ESS 2 650.2 may be in a same physical location such as a stadium and the management entity 604 may determine SR parameters 810 for both ESSs 650. In some embodiments, the management entity 604 and/or HE AP 502 determine the SR parameters 810 for each ESS 650 to improve the throughput of the combined network 600 or to improve the throughput of the ESSs 650 managed by the management entity 604. In some embodiments, the IEEE 802.11 communication standard (e.g., 80.2.11ax) may include default values for the Non SRG parameters 810.

In some embodiments a SRG 808 is a group of BSSs 500 and the associated stations (e.g., HE stations 504 and legacy devices 506). In some embodiments a SRG 808 is a group of HE stations 504, HE APs 502, and/or legacy devices 506 that are managed by a same management entity 604. In some embodiments, a SRG 808 is a group of HE stations 504 and/or HE APs 502 that are managed by a same management entity 604 and that are defined by the management entity 604 to be part of the same SRG 808. For example, the HE AP 502 and HE stations 504 that are part of an ESS 650 may be all part of the same SRG 808, but the management entity 604 may exclude some HE AP 502, HE stations 504, and/or legacy devices 506. In some embodiments a SRG 808 may be termed an ESS management domain. In some embodiments, a SRG 808 may be an ESS 650. In some embodiments, a SRG 808 may be a SR ESS group. In some embodiments, a SRG 808 may be termed a management domain. In some embodiments, an SRG 808 may be one or more ESS IDs 630 that are part of the SRG.

The SRG BSS colors 812 (e.g., SRG BSS Colors 1212, SRG BSS color Bitmap 1302, SRG BSS Color Bitmap 1658, SRG BSS Color Bitmap 1716) may be BSS colors for identification of BSSs 500 that are members of the same SRG 808. The management entity 604 and/or HE APs 502 may generate the SRG BSS colors 812. The management entity 604 may generate BSS colors for the HE APs 502 in the ESS 650. The HE APs 502 may generate the BSS colors and report them to the management entity 604. The management entity 604 may transmit the SRG BSS COLORS 812 to the HE AP 502 and/or HE stations 504.

The management entity 604 may maintain a data structure of BSS colors (e.g., SRG BSS Colors 1212, SRG BSS color Bitmap 1302, SRG BSS Color Bitmap 1658, SRG BSS Color Bitmap 1716) used by HE APs 502 that are managed by the management entity 604. SRG BSS colors 812 may be a SRG BSS colors 1212, SRG BSS color bitmap 1302, SRG BSS Color Bitmap 1658, SRG BSS Color Bitmap 1716, as described in conjunction with FIGS. 12, 13, 16, 17, respectively. The SRG colors 812 may be BSS colors of the BSSs 500 that are managed by the management entity 604, e.g., BSSs 500 that are part of an ESS 650.

The ESS ID 630 may be an identification of the ESS 650 that the management entity 604 manages as described in conjunction with FIG. 6. In some embodiments, the management entity 604 may manage more than one ESS 650. In some embodiments, the ESS ID 630 may be used to determine the SRG 808.

In some embodiments, the SRG BSS BSSIDS 814 are BSSIDs (704, 1006) or indication of BSSIDs of HE stations 504 and/or HE APS 502 that are part of a same SRG 80$ (e.g., one or more ESSs 630).

The SRG BSS BSSIDS 814 may be BSSIDs or indications of BSSIDs for identification of SR BSSs 500. The management entity 604 and/or HE APs 502 may generate the SRG BSS BSSIDS 814. The management entity 604 may generate BSSIDs (e.g., 704, 906, 1006) for the HE APs 502 in the ESS 650. The HE APs 502 may generate the BSSIDs 704, 1006 and, in some embodiments, report them to the management entity 604. The management entity 604 may transmit the BSSIDs (e.g., 704, 906, 1006) to the HE AP 502 and/or HE stations 504. The management entity 604 may maintain a data structure of BSSIDs (704, 906, 1006) used by HE APs 502 that are managed by the management entity 604. SRG BSS BSSIDs 814 may be a data structure that can be used to identify which BSSIDs (e.g., 704, 906, 1006) are part of the SRG 808, management domain, and/or ESS 650.

The SRG BSS BSSIDS 1214, BSSID list 1400, BSSID Hashed Index 1450, SRG Partial BSSID Bitmap 1475, BSSID range 1500, BSSID range of bits match 1550, SRG partial BSSID Bitmap 1660, SRG partial BSSID bitmap 1718 are examples of SRG BSS BSSIDs 814.

The SRG BSS BSSIDS 814 may indicate BSSIDs 704, 906, 1006 that are managed by the management entity 604, e.g., BSSs 500 that are part of an ESS 650. In some embodiments, the SRG BSS BSSIDs 814 enable a HE station 504 and/or HE AP 502 to determine if a BSSID (e.g., 704, 906. 1006) is part of the same management domain, SRG 808 or ESS 650 as a HE station 104 and/or HE AP 502.

Figure 9:
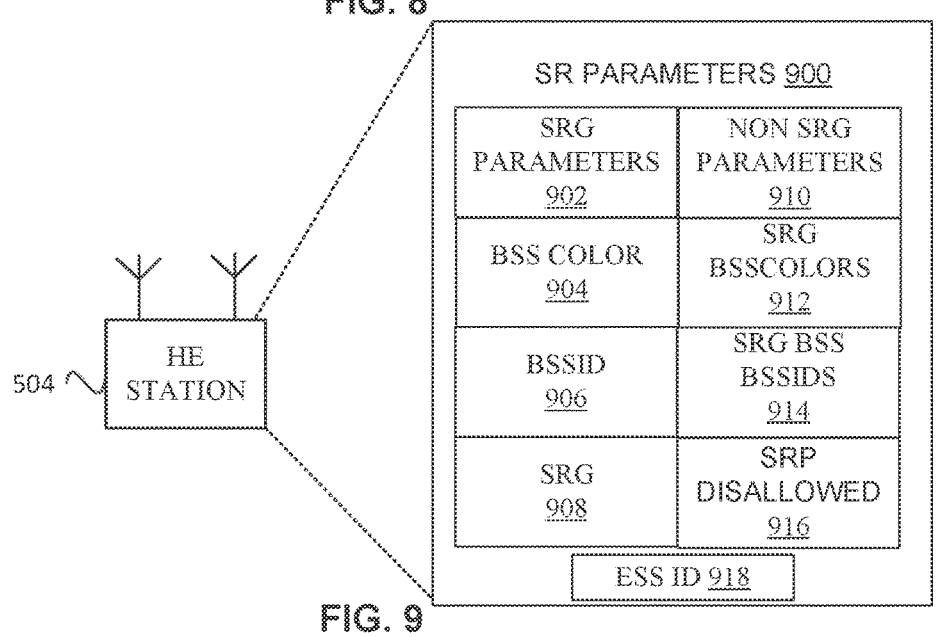
FIG. 9 illustrates a HE station in accordance with some embodiments.

FIG. 9 illustrates a HE station 504 in accordance with some embodiments. The HE station 504 may include one or more of an SRG parameters 902, non SRG parameters 910, BSS color 904, SRG BSS colors 912, BSSID 906, SRG BSS BSSIDS 914, SRG 908, SRP disallowed 916, and ESS ID 918.

SRG parameters 902 may be the same or similar as SRG parameters 802. The SRG parameters 902 may be received from an HE AP 502 with which the HE station 504 is associated, and/or from a management entity 604.

Non SRG parameters 910 may be the same or similar as non SRG parameters 810. The SRG parameters 902 may be received from an HE AP 502 with which the HE station 504 is associated, and/or from a management entity 604.

BSS color 904 may be a BSS color as described herein, e.g. in conjunction with FIGS. 6 and 7. The BSS color 904 may be received from an HE AP 502 with which the HE station 504 is associated, and/or from a management entity 604. In some embodiments an HE AP 502 may have multiple BSS colors 904 and the HE station 504 may receive multiple BSS colors 904 from the HE AP 502.

Non SRG BSS Colors 912 may be the same or similar as non SRG BSS Colors 812. The SRG BSS Colors 912 may be received from an HE AP 502 with which the HE station 504 is associated.

The BSSID 906 may be the same or similar as BSSID as described herein, e.g., in conjunction with FIGS. 6 and 7. The BSSID 906 may be the BSSID 906 of the BSS 500 with which the HE station 104 is associated, e.g., a BSSID 906 for HE station 504.3 (FIG. 6) may be the BSSID 1006 of HE AP 502.2. The BSSID 906 may be received from an HE AP 502 with which the HE station 504 is associated.

SRG BSS BSSIDs 914 may be the same or similar as SRG BSS BSSIDs 814. The SRG BSS BSSIDs 914 may be received from an HE AP 502 with which the HE station 504 is associated, and/or from a management entity 604.

SRG 908 may be the same or similar as SRG 808. The SRG 908 may be received from an HE AP 502 with which the HE station 504 is associated, and/or from a management entity 604.

SRP disallowed 916 may be an indication of whether SR is allowed or not for inter-BSS PPDUs (e.g. 700) that are in a same management domain, SRG 908, and/or ESS 650. In some embodiments, if SRP disallowed 916 is set then the HE station 504 uses the non SRG parameters 910 for inter-BSS PPDUs 700. In some embodiments, SRP disallowed 916 may indicate that SR is disallowed. In some embodiments, there may be a separate field to indicate that SR is disallowed. ESS ID 918 may be the same or similar as ESS ID 630, and may be the ESS ID 630 of the management entity 604 and/or the ESS 650 that manages the BSS 500 with which the HE station 504 is associated.

Figure 10:
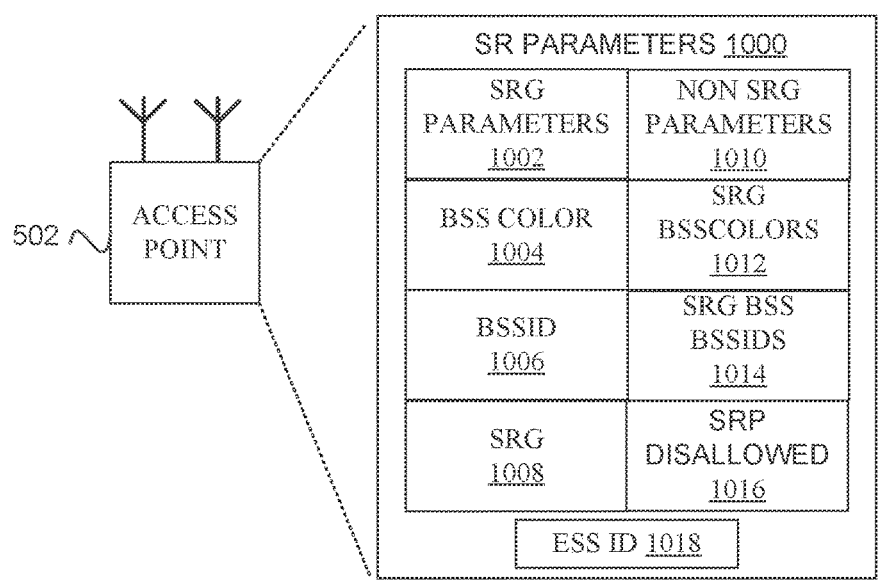
FIG. 10 illustrates an access point in accordance with some embodiments.

FIG. 10 illustrates an access point 502 in accordance with some embodiments. The HE AP 502 may include one or more of an SRG parameters 1002, non SRG parameters 1010, BSS color 1004, SRG BSS Colors 1012, BSSID 1006, SRG BSS BSSIDS 1014, SRG 1008, SRP disallowed 1016, and ESS ID 1018.

SRG parameters 1002 may be the same or similar as SRG parameters 802. The SRG parameters 1002 may be received from a management entity 604 with which the HE AP 502 is associated. In some embodiments, the HE AP 502 generates the SRG parameters 1002.

Non SRG parameters 1010 may be the same or similar as non SRG parameters 810. The SRG parameters 1002 may be received from a management entity 604 with which the HE AP 502 is associated. In some embodiments, the HE AP 502 generates the non SRG parameters 1010.

BSS color 1004 may be a BSS color as described herein, e.g. in conjunction with FIGS. 6 and 7. The BSS color 1004 may be received from a management entity 604 with which the HE AP 502 is associated. In some embodiments the HE AP 502 may have multiple BSS colors 1004. In some embodiments, the HE AP 502 generates the BSS color 1004.

SRG BSS Colors 1012 may be the same or similar as non SRG BSS Colors 812. The SRG BSS Colors 1012 may be received from an HE AP 502 with which the HE station 504 is associated.

The BSSID 1006 may be the same or similar as BSSID as described herein, e.g., in conjunction with FIGS. 6, 7, 8, and 9. The BSSID 1006 may be the BSSID 1006 of the BSS 500 with which the HE AP 502 is associated, e.g., a BSSID 1006 for HE AP 502.2 (FIG. 6). The BSSID 1006 may be received from a management entity 604 with which the HE AP 502 is associated. The HE AP 502 may generate the BSSID 1006.

SRG BSS BSSIDs 1014 may be the same or similar as SRG BSS BSSIDs 814. The SRG BSS BSSIDs 1014 may be received from a management entity 604 with which the HE AP 502 is associated. The HE AP 502 may generate the SRG BSS BSSIDs 1014.

SRG 1008 may be the same or similar as SRG 808. The SRG 1008 may be received from a management entity 604 with which the HE AP 502 is associated. The HE AP 502 may generate the SRG 1008.

SRP disallowed 1016 may be the same or similar as SRP disallowed 916. The HE AP 502 may receive SRP disallowed 1016 from a management entity 604. The HE AP 502 may generate SRP disallowed 1016. The HE AP 502 may transmit SRP disallowed 1016 to HE stations 504, which, in some embodiments, are associated with the HE AP 502.

ESS ID 1018 may be the same or similar as ESS ID 630. The ESS ID 1018 may be sent to the HE AP 502 from a management entity 604 the HE AP 502 is associated with. In some embodiments, the HE AP 502 generates the ESS ID 1018.

Figure 11:
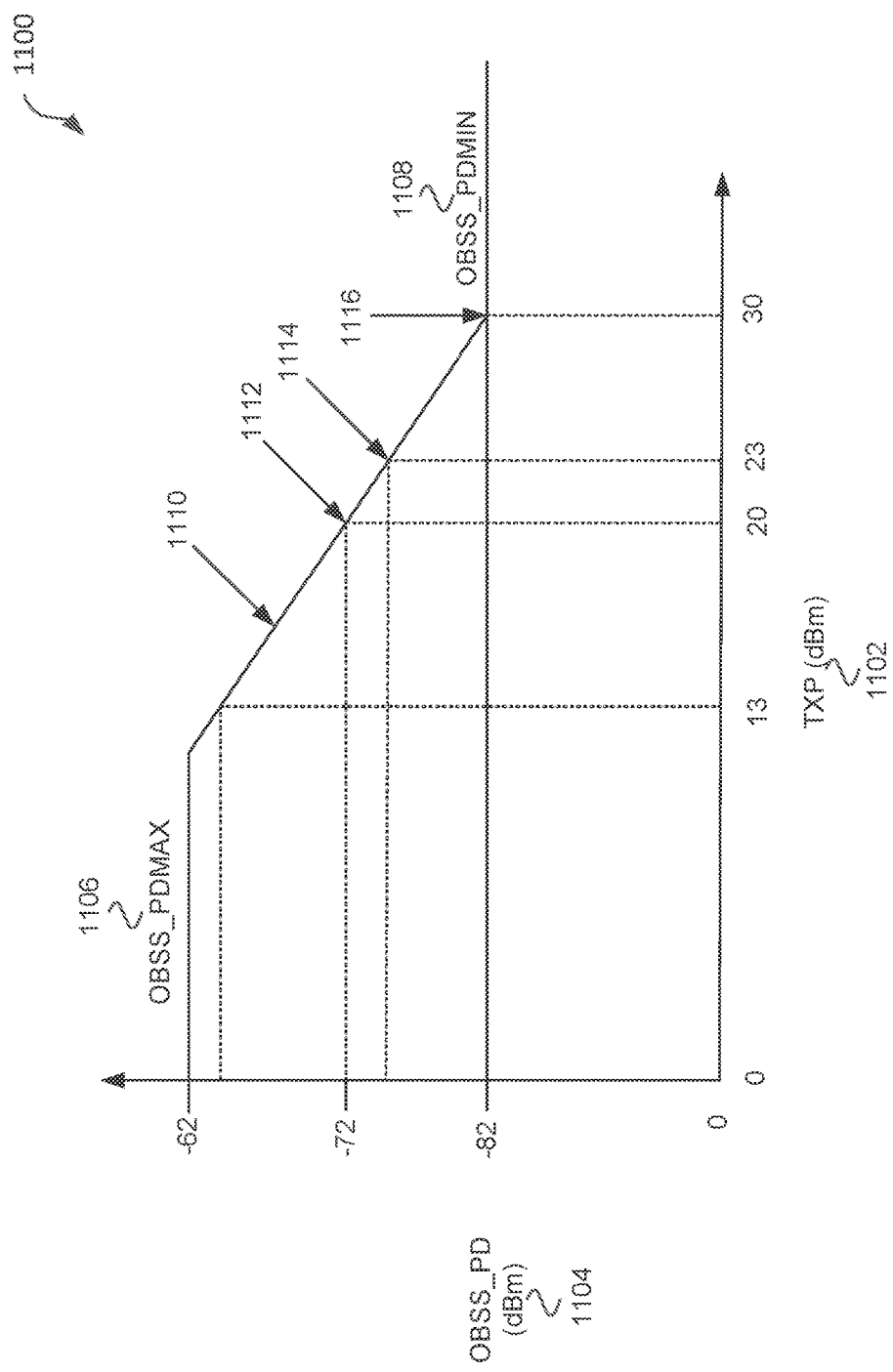
FIG. 11 illustrates a method for setting parameters for an overlapping BSS (OBSS) PD level and transmit power (TXP) in accordance with some embodiments.

FIG. 11 illustrates a method 1100 for setting parameters for an overlapping BSS (OBSS) power detect (PD) level and transmit power (TXP) in accordance with some embodiments. Illustrated in FIG. 11 is TXP 1102 along a horizontal axis, OBSS PD (dBm) 1104 along a vertical axis, operating line 1110, OBSS_PDMAX 1106, and OBSS_PDMIN 1108. The OBSS PD (dBm) 1104 may be an energy detection level. For example, the received signal strength indication (RSSI) may return a value after detecting received energy as part of clear channel assessment (CCA). If the detected energy level is below the OBSS_PD 1104 setting, then the energy, which may be a PPDU (e.g., 700), is ignored in that the HE station 504 and/or HE AP 502 will not defer (e.g., set a NAV) based on the received energy. In some embodiments, the OBSS PD (dBm) 1104 may be an energy detect level that a master station 502 and/or HE station 504 may use to determine whether or not to spatially reuse the channel. For example, if OBSS PD (dBm.) 1104 is below a set level, then the HE AP 502 and/or HE station 504 may begin transmitting a PPDU (e.g. 700) while still receiving the other PPDU (e.g., 700). The OBSS_PDMAX 1106 and OBSS_PDMIN 1108 may be in accordance with one or more communication standards. The TXP 1102 is a power used to transmit packets by the HE AP 502 and/or HE station 504. The OBSS_PD 1104 and TXP 1102 may be based on a bandwidth, e.g., 20 MHz.

The operating line 1110 is a line defined by Equation (1): OBSS_PD=MAX[OBSS_PDMIN, MIN(OBSS_PDMAX, OBSS _PDMIN+(TX_PWR$_{REF}$-TX_PWR))], where TX_PWR$_{REF}$ may be a reference TW_PWR., e.g., a maximum TXP of a HE STA 504. The PD levels may refer to threshold PD levels.

The operating line 1110 may define combinations of TXP 1102 and OBSS PD 1104 that a HE AP 502 and/or HE station 504 may select for operating. The operating line 1110 may define the outside bound of TXP 1102 and OBSS PD 1104 an HE AP 502 and/or HE station 504 may select for operating, e.g., the HE AP 502 and/or HE station 504 may select points that are within the OBB_PDMAX 1106, the operating line 1110, and the vertical line from TXP 1102 of 30 dBm. For example, a HE station 504 and/or HE AP 502 may select a TXT 1102 that falls below the operating line 1110, or an OBSS_PD 1104 that is lower. There may be a minimum TXP 1102 in some embodiments. TXP 1102 may be a reference transmit power.

In some embodiments, the higher the TXP 1102, then the lower the OBSS PD 1104 the HE AP 502 and/or HE station 504 selects. For example, the HE AP 502 and/or HE station 504 may use TXP 1102 of 20 dBm and an OBSS PD 1104 of −72 dBm, which may be at point 1112 of operating line 1110. If the HE AP 502 and/or HE station 504 wants to use a greater TXP 1102, e.g., 23 dBm, then the HE AP 502 and/or HE station 504 increases the sensitivity of OBSS PD dBm 1104 to −75 dBm., which may be at point 1114 of operating line 1110. TXP 1102 of 13 dBm. may be a minimum TXP 1102 although other values of TXP 1102 may be used for a minimum TXP 1102.

The following is an example use of equation (1) for TXP 1102 of 20 dBM. OBSS_PD=MAX[OBSS_PDMIN(20 MHz) (=−82), MIN(OBSS_PDMAX (=−62), OBSS_PDMIN (=−82)+(TX_PWR$_{REF}$(=30)−TX_PWR (=20 given))], which derives: OBSS_PD=MAX[−82, MIN(−62, −82+30−20))]=MAX[−82, MIN(−62, −82 +10))]=MAX[−82, MIN(−62, −82+10))]=MAX[−82, MIN(−62, −72))]=MAX[−82, MIN(−72))]=MAX[−72]=−72, which is in agreement with point 1112. The PD levels may refer to threshold. PD levels.

Point 1116 may be the default parameters for TXP 1102 30 dBm and OBSS PD 1104 −82 dBm for legacy devices 506 for 20 MHz bandwidth. The default parameters for 40 MHz bandwidth may be −79 dBm for OBSS PD 1104. The access point 502 and/or HE stations 104 may use the OBSS PD 1104 to determine whether to spatially reuse the bandwidth.

The operating line 1110 may have a slope parameter. Equation (2): OBSS_PD=MAX[OBSS_PDMIN, MIN(OBSS_PDMAX, OBSS_PDMIN+(slope parameter)*(TX_P-WR$_{REF}$−TX_PWR))], where the TX_PWR$_{REF}$ may be equal to a maximum power of a station. The PD levels may refer to threshold PD levels.

For the OBSS_PD_min parameters, the default value may be the default legacy PD level (e.g., −82 dBm for 20 MHz, −79 dBm for 40 MHz, etc). In some embodiments, an OBSS PPDU may be an inter-BSS PPDU. In some embodiments, SR parameters (or a portion of SR parameters) 710, 802, 902, 1002, 1200, 1600, 1700, and/or non-SRG parameters 810, 910, 1010, may indicate values for one or more of OBSS PD (dBm) 1104, operating line 1110, OBSS_PDMAX 1106, and/or OBSS_PDMIN 1108. The HE stations 504 and/or HE APs 502 may be configured to use the non-SRG parameters 810, 910, 1010, 1210, when SRG is not allowed or a received PPDU (e.g., 700 is determined not be an inter-BSS SRG PPDU. The HE stations 504 and/or HE APs 502 may be configured to use the SRG parameters 802, 902, 1002, and 1202, when SRG is allowed and a received PPDU (e.g., 700) is determined to be an inter-BSS SRG PPDU.

Figure 12:
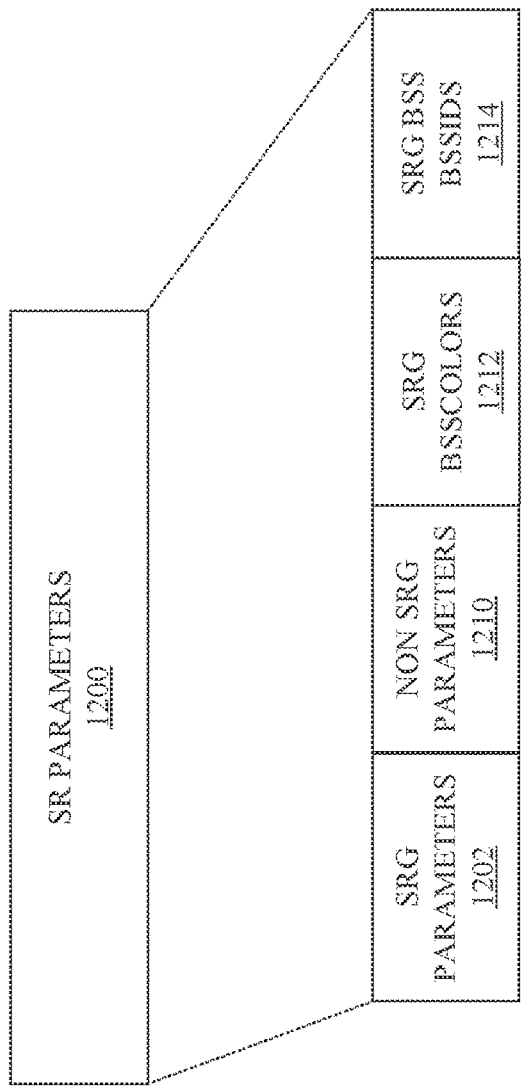
FIG. 12 illustrates SR parameters in accordance with some embodiments.

FIG. 12 illustrates SR parameters 1200 in accordance with some embodiments. The SR parameters 1200 include one or more of SRG parameters 1202, non SRG parameters 1210, SRG BSS Colors 1212, and SRG BSS BSSIDS 1214.

SRG parameters 1202 may be the same or similar as SRG parameters 802, 902, 1002, 1202. Non SRG parameters 1210 may be the same or similar as non SRG parameters 810, 910, 1010, 1210. SRG BSS colors 1212 may be the same or similar as SRG BSS colors 812, 912, or 1012. SRG BSS BSSIDS 1214 may be the same or similar as SRG BSS BSSID 814, 914, or 1014. The SRG parameters 1202 may be included in a PPDU (e.g., 700) as fields of the PPDU or in an information element. In some embodiments, the HE AP 502 transmits the SRG parameters 1202 as part of a beacon (e.g., PPDU 700).

Figure 13:
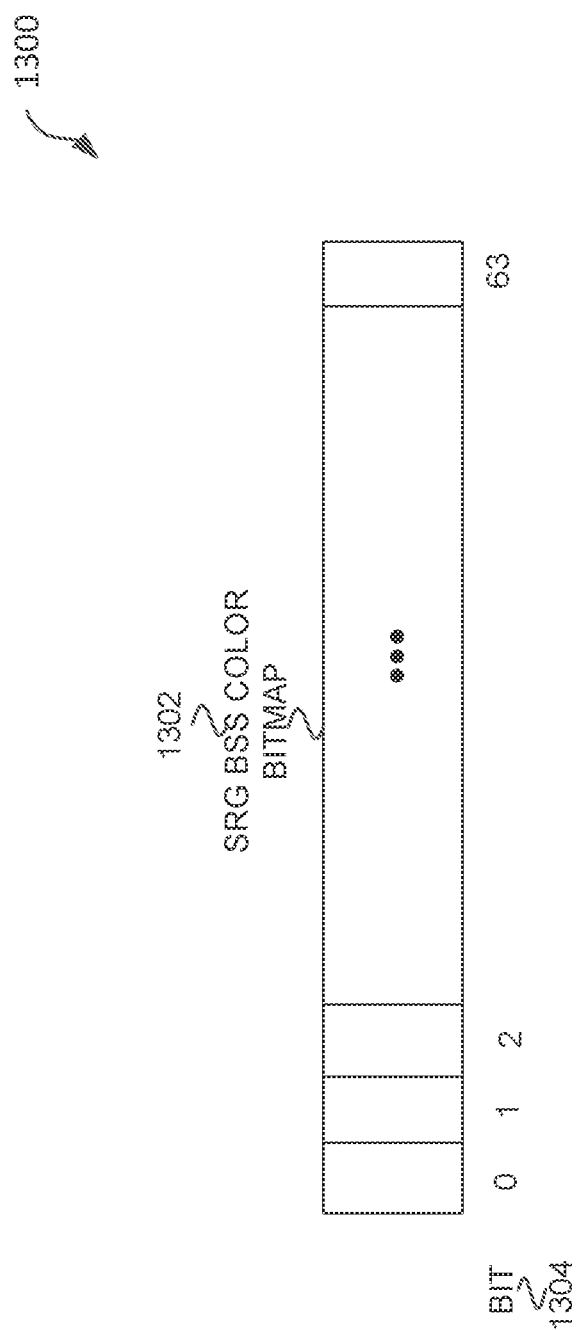
FIG. 13 illustrates a SRG BSS color bitmap in accordance with some embodiments.

FIG. 13 illustrates a SRG BSS color bitmap 1302 in accordance with some embodiments. Illustrated in FIG. 13 is SRG BSS color bitmap 1302, which may include bits 1304. Each bit 1304 corresponds to one of the 63 available BSS colors. In some embodiments, the lowest numbered bit corresponds to a BSS color (e.g., BSS color 1004) value 0 and the highest numbered bit corresponds to BSS color value of 63. A bit 1304 may be set to I if a BSS with a BSS color corresponding to that bit 1304 is part of a same management domain, SRG, and/or ESS 650. For example, HE AP 502.1 may have a BSS color 1004 of 2, HE AP 502.1 may have BSS color 1004 of 4, and HE AP 502.3 may have a BSS color of 5. HE AP 502.1 may have a SRG BSS color bitmap 1302 with bits 2, 4, and 5 set. In some embodiments, the management entity 604 generates the SRG BSS color bitmap 1302. In some embodiments, one or more HE APs 502 generate the SRG BSS color bitmap 1302. In some embodiments, the management entity 604 sends the SRG BSS color bitmap 1302 to the HE APs 502 (e.g., management entity 604 may transmit SRG BSS color bitmap 1302 to HE AP 502.1, 502.2, and 502.3). In some embodiments, the HE AP 502 transmits the SRG BSS color bitmap 1302 to HE stations 104 that are associated with the HE AP 502. In some embodiments, the HE AP 502 transmits the SRG BSS color bitmap 1302 in one or more transmission, e.g. a PPDU (e.g., 700) such as a beacon frame or an association PPDU (e.g. 700).

The HE stations 504 and/or HE APs 502 may be configured to determine whether a PPDU 700 is part of the same management domain (e.g., ESS 650) using the SRG BSS color bitmap 1302. The SRG BSS color bitmap 1302 may be termed a BSS color bitmap in accordance with some embodiments. The SRG BSS color bitmap 1302 may be termed a SRG color bitmap in accordance with some embodiments. In some embodiments, the number of bits 1304 may be different.

The HE APs 502 may be configured to transmit updated SRG BSS color bitmap 1302 if one or more HE APs 502 change their BSS color 1004. In some embodiments, the management entity 604 may send new SRG BSS color bitmaps 1302 to one or more of the HE APs 502 if an HE AP 502 that is part of the same ESS 650 or management domain change their BSS color. In some embodiments, a HE AP 502 may have more than one BSS color and the SRG BSS color bitmap 1302 may include an indication for each of the more than one BSS colors of the HE AP 502. The SRG BSS color bitmap 1302 may be the same or similar as SRG BSS colors 812, 912, or 1012.

Figure 14A:
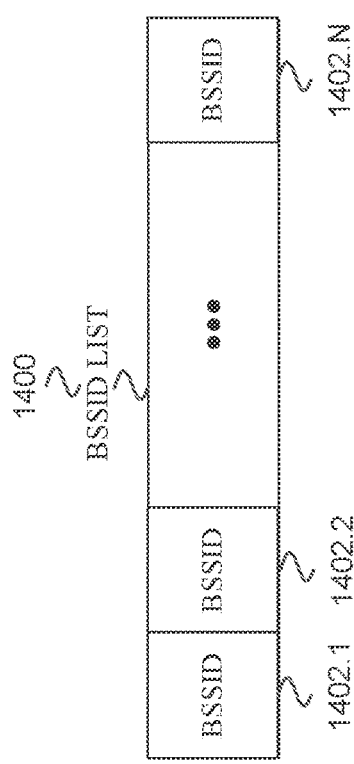
FIG. 14A illustrates BSSID list in accordance with some embodiments.

FIG. 14A illustrates BSSID list 1400 in accordance with some embodiments. The BSSID list 1400 may include BSSIDs 1402.1 through BSSID 1402.N. The BSSIDs 1402 may be BSSIDs 1402 of HE APs 502 that are part of the same management domain, SRG, and/or ESS 650. In some embodiments, the BSSIDs 1402 are 48 bits each. The BSSIDs 1402 may be compressed in accordance with some embodiments 1402. For example, in some embodiments only a range of bits of the BSSID are included the BSSID 1402 fields, e.g., only bits 39 through 44. In some embodiments, the BSSIDs 1402 are the same or similar to BSSIDs 704, 1006.

Figure 14B:
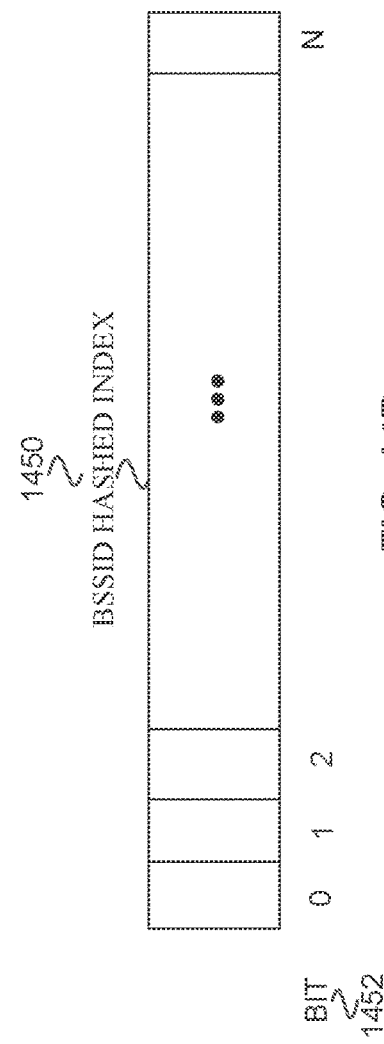
FIG. 14B illustrates a BSSID hashed index in accordance with some embodiments.

FIG. 14B illustrates a BSSID hashed index 1450 in accordance with some embodiments. The BSSID hashed index 1450 may be N bits 1452. A HE station 504 and/or HE AP 502 may use a hashing function (not illustrated) and apply the hashing function to BSSIDs in management domain, ESS 650, and/or SRG 908, of the HE station 504 and/or HE AP 502, (e.g., the BSSIDs 1402 of the BSSID list 1400) to convert a 48 bit BSSID (e.g., 1402) into an 6, 7, 8, or 9 bit (or another number of bits) index value. The bits 1452 of the BSSID hashed index 1450 correspond to the values the hash function can take, and a bit may be set to 1 (or 0), if the hashed value of the BSSID is part of the same management domain, ESS 650, and/or SRG 908.

HE station 504 and/or HE AP 502 may receive an inter-BSS PPDU (e.g., 700), and if the PPDU includes a BSSID (e.g., BSSID 704, RA 706, TA 708), then the HE station 504 and/or HE AP 502 may perform the hash function on the received BSSID, and if the corresponding bit 1452 of the BSSID hashed index 1450 is set, then the HE station 504 and/or HE AP 502 may determine that the PPDU is part of the same management domain, ESS 650, and/or SRG 908, as the HE station 504 and/or HE AP 502, respectfully. In some embodiments, the HE station 504 and/or HE AP 502 only checks the BSSID hashed index 1450 if the PPDU 700 is an inter-BSS PPDU (e.g., 700).

In some embodiments, the HE AP 502 and/or management entity 604 may determine the BSSID hashed index 1450 and send or transmit it to the HE stations 504 and/or HE AP 502.

Figure 14C:
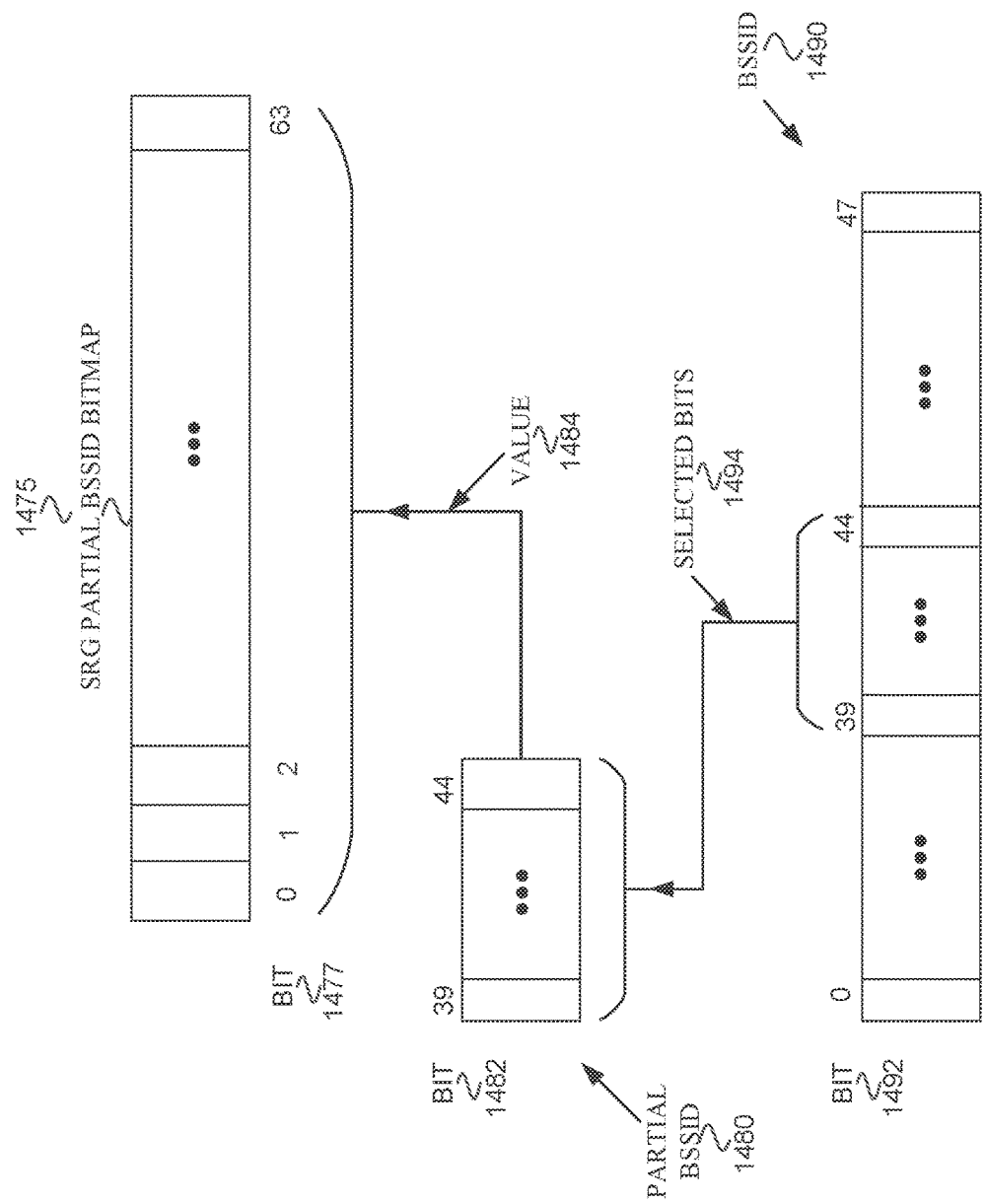
FIG. 14C illustrates an SRG partial BSSID Bitmap, partial BSSID, and BSSID in accordance with some embodiments.

FIG. 14C illustrates an SRG partial BSSID Bitmap 1475, partial BSSID 1480, and BSSID 1490 in accordance with some embodiments. The SRG Partial BSSID Bitmap 1475 subfield is a bitmap that indicates which partial BSSID 1480 values 1484 are used by members of the SRG (e.g., 908, 1008) of which the transmitting STA (e.g., HE station 504 and/or HE AP 502) is a member. The SRG Partial BSSID Bitmap 1475 may be n bits 1477 (e.g., 64 bits as illustrated; one bit per value 1484 of partial BSSID 1480). A HE station 504 and/or HE AP 502 may use a hashing function that selects a range of selected bits 1494 from the BSSID 1490 (e.g., the BSSIDs of the BSSID list 1400), e.g., bits (1492) 39 through 44 for 6 bits. The range of bits may be termed a partial BSSID 1480 and the value 1484 of the partial BSSID 1480 may be termed a partial BSSID value, in accordance with some embodiments. Each bit 1477 of the SRG partial BSSID Bitmap 1475 corresponds to one of the 2^6 (64) possible values 1484 of the bits (1482) 39 through 44, where bit (1477) 0 may correspond to value (1484) 0 of the 2^6 possible values of partial. BSSID 1480, and bit (1477) n (63) corresponds to the value (1484) 63 of partial BSSID 1480. N may be 63 for a total of 64 bits 1477 for SRG partial BSSID Bitmap 1475. If a bit 1477 is 0 in the SRG partial BSSID Bitmap 1475, then an HE AP 502 in the same SRG as the HE station 504 or HE AP 502 of the SRG partial BSSID Bitmap 1475 does not use the BSSID corresponding to the value 1484 of the partial BSSID 1480. If a bit is 1 in the SRG partial BSSID Bitmap 1475, then an HE AP 502 in the same SRG as the HE station 504 or HE AP 502 of the SRG partial BSSID Bitmap 1475 does use the BSSID corresponding to the value 1484 of the partial BSSID 1480.

For example, if the value 1484 of BSSID bits (1492) 39 through 44 is 27, then the 27th bit (1477) of SRG partial BSSID bitmap 1475 may be used to determine whether the BSSID 1490 is included in the SRG (e.g., 908, 1008) of the SRG partial BSSID Bitmap 1475, e.g. a value 1484 of 1 indicates the BSSID 1490 is in the SRG (e.g., 908, 1008) and a value 1484 of 0 indicates the BSSID 1490 is not in the SRG (e.g., 908, 1008).

In some embodiments, the hash function masks or selects a different number and/or different range of selected bits 1494, e.g. bits 25 through 29 for 5 bits. The SRG partial BSSID Bitmap 1475 may then be sized for one bit per possible value of the selected bits 1494. In some embodiments, the SRG partial BSSID Bitmap 1475 may reserve 0 for BSSIDs 1490 that are not part of the same SRG (e.g., 908, 1008). In some embodiments, the highest numbered bit 1477 of SRG partial BSSID Bitmap 1475 may correspond to the value (1484) 0 and the lowest numbered bit 1477 of SRG partial BSSID Bitmap 1475 may correspond to the highest value 1484 of the bit range.

A HE station 504 and/or HE AP 502 may receive an inter-BSS PPDU (e.g., 700), and if the PPDU 700 includes a BSSID 1490 (e.g., BSSID 704, RA 706, TA 708), then the HE station 504 and/or HE AP 502 may perform the hash function (e.g., select bits selected bits 1494) on the received BSSID 1490, and if the bit 1477 of the SRG partial BSSID Bitmap 1475 corresponding to the value 1484 of the partial BSSID 1480 is set, then the HE station 504 and/or HE AP 502 may determine that the PPDU 700 is part of the same SRG (e.g., 908, 1008) as the HE station 504 and/or HE AP 502. In some embodiments, the HE station 504 and/or HE AP 502 only checks the BSSID hashed index 1450 if the PPDU 700 is an inter BSS PPDU 700. If the PPDU 700 is an intra BSS, then the HE station 504 and/or HE AP 502 determines that SR cannot be performed, in accordance with some embodiments.

In some embodiments, the HE AP 502 and/or management entity 604 may determine the SRG partial BSSID Bitmap 1475 and send or transmit it to the HE stations 504 or HE AP 502, respectfully.

The range of bits (e.g., selected bits 1494) of the BSSID 1490 may be termed partial BSSID information (e.g., partial BSSID 1480). If partial BSSID information is present in a PPDU 700, the PPDU is determined to be an SRG PPDU if the bit 1477 corresponding to the value 1484 of the partial BSSID information (e.g., partial BSSID 1480) of SRG Partial BSSID Bitmap 1475 is 1. Otherwise, the PPDU 700 is not determined to be an SRG PPDU.

In some embodiments, each bit of the bitmap (e.g., SRG partial BSSID bitmap 1475) corresponds to one of the 2^6 possible values of BSSID[39:44], where the lowest numbered bit (e.g., bit 1477 0) corresponds to value 11484 of 0 of partial BSSID 1480, and the highest numbered bit (e.g., bit 1477 63) corresponds to value 1484 of 63 of partial BSSID 1480. In some embodiments, if a bit 1477 in the bitmap (e.g., SRG partial BSSID bitmap 1475) is set to 0, then no BSS 500 in the same SRG 908, 1008 of the transmitting STA (e.g., HE station 504 and/or HE AP 502) uses the corresponding value 1484 of the partial BSSID 1480.

Figure 15A:
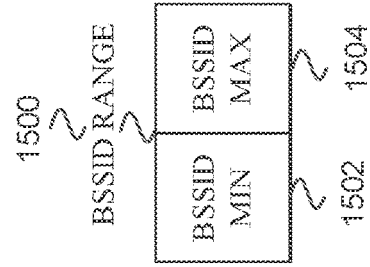
FIG. 15A illustrates BSSID range in accordance with some embodiments.

FIG. 15A illustrates BSSID range 1500 in accordance with some embodiments. The BSSID range 1500 may include a BSSID min 1502 and BSSID max 1504. The HE APs 502 from the same management domain, ESS 650, or SRG, may be assigned BSSIDs 1006 that are between (which may be inclusive) BSSID min 1502 and BSSID max 1504.

A HE station 504 and/or HE AP 502 may receive an inter-BSS PPDU (e.g., 700), and if the PPDU 700 includes a BSSID (e.g., BSSID 704, RA 706, TA 708), then the HE station 504 and/or HE AP 502 may determine if the received BSSID is within the range of BSSID min 1502 and BSSID max 1504 (which may be inclusive). If the BSSID is between BSSID min 1502 and BSSID max 1504, then the OBSS PPDU is part of the same management domain, ESS 650, or SRG 908, 1008 as the HE station 504 and/or HE AP 502. The HE AP 502 and/or management entity 604 may send the BSSID range 1500 to HE APs 502 and/or HE stations 104. The HE AP 502 may send the BSSID range 1500 to HE stations 504, which, in some embodiments, are associated with the HE AP 502.

Figure 15B:
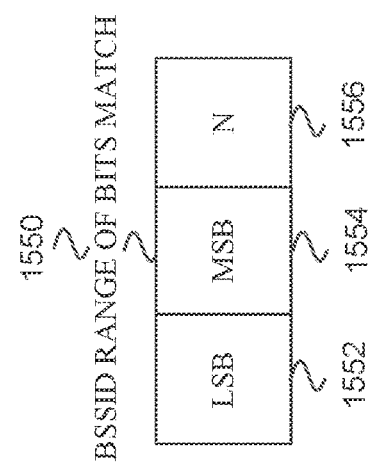
FIG. 15B illustrates a BSSID range of bits match in accordance with some embodiments.

FIG. 15B illustrates a BSSID range of bits match 1550 in accordance with some embodiments. The BSSID range 1550 may include least significant bit (LSB) 1552, most significant bit (MSB) 1554, and N 1556. In some embodiments, one or more of the fields LSB 1552, MSB 1554, and N 1556, may not be present. For example, the fields may be one of the following: only LSB 1552; only MSB 1554; LSB 1552 and N 1556; or, MSB 1554 and N 1556. N 1556 may indicate the number of bits of LSB 1552 or MSB 1554 (e.g., 6 or 42 bits or another number of bits). The LSB 1552 may be the first 42 bits (or another number of bits) of the BSSIDs, and the MSB 1554 may be the last 6 or 42 bits (or another number of bits) of the BSSID.

The HE APs 502 from the same management domain, ESS 650, or SRG, may be assigned BSSIDs 1006 that have bits that match LSB 1552 or MSB 1554.

A HE station 504 and/or HE AP 502 may receive an inter-BSS PPDU (e.g., 700), and if the inter-BSS PPDU includes a BSSID (e.g., BSSID 704, RA 706, TA 708), then the HE station 504 and/or HE AP 502 may determine if the received BSSID has the same bits as indicated LSB 1552, MSB 1154, and/or N 1556. For example, if LSB 1552 is 30 bits, and the BSSID of PPDU 700 has the same LSB 1552 30 bits, then the OBSS PPDU is part of the same management domain, ESS 650, or SRG 908, 1008 as the HE station 504 and/or HE AP 502, respectfully.

FIG. 16 illustrates SR parameters 1600 in accordance with some embodiments. The SR parameters 1600 may include SRG OBSS TX max 1652, SRG OBSS PD min 1654, SRG OBSS RD max 1656, SRG BSS color bitmap 1658, and/or SRG Partial BSSID bitmap 1660. SR parameters 1600 may be similar or the same as SR parameters 710, 1200, 1600, 1700, SRG parameters 802, 902, 1002, 1202, and/or non-SRG parameters 810, 910, 1010, 1210.

In some embodiments, the SR parameters 1600 may include an indication that one or more of the fields is not included. In some embodiments, the SR parameters 1600 may include an indication whether SR is allowed. In some embodiments, the SR parameters 1600 may include an indication whether SR is allowed based on SRG determination. In some embodiments. SR parameters 1600 may be part of an information element that is carried by a PPDU (e.g., 700). In some embodiments, SR parameters (e.g., 1600) are fields of a PPDU (e.g., 700). In some embodiments, SRG OBSS TX Maximum (max) 1652 may be part of SRG parameters 802, 902, 1002, 1202, and/or SR parameters 710, 1700. The SRG OBSS TX max 1652 may indicate a maximum TX (e.g., TXP 1102 at 30 dBm) for the receiver of the SR parameters 1600, e.g., a HE station 504 and/or HE AP 502. The SRG OBSS TX max 1652 may be used to determine if SR can be used for inter-BSS (e.g., OBSS) PPDUs (e.g., 700) determined to be in the same management domain, SRG, and/or ESS as the device (e.g., HE station 504 or HE AP 502) using the SR parameters 1600. In some embodiments, the SRG OBSS TX max 1652 may be indicated as an offset from a reference number.

In some embodiments, SRG OBSS PD minimum (min) 1654 may be part of SRG parameters 802, 902, 1002, 1202, and/or SR parameters 710, 1700. SRG OBSS PD min 1654 may be an indication of a PD min for determining if SR can be used for inter-BSS (e.g, OBSS) PPDUs (e.g., 700) determined to be in the same management domain, SRG (e.g., 908, 1008), and/or ESS 650 as the wireless device (e.g., HE station 504 or HE AP 502) using the SR parameters 1600. In some embodiments the SRG OBSS PD min 1654 may be indicated as an offset from a reference value, e.g., an offset from OBSS_PD 1104 (FIG. 11) −82 (OBSS_PDMIN) or −62 dBM (OBSS_PDMAX 1106). SRG OBSS PD MIN 1654 may be used to determine OBSS_PDMIN 1108 for inter-BSS PPDUs (e.g., 700) that are determined to be in the same management domain, SRG (908, 1108), and/or ESS 650.

In some embodiments, SRG OBSS PD maximum (max) 1656 may be part of SRG parameters 802, 902, 1002, 1202, and/or SR parameters 710, 1700, SRG OBSS PD max 1656 may be an indication of a PD max for determining if SR can be used for OBSS PPDUs 700 determined to be in the same management domain, SRG (e.g., 908, 1008), and/or ESS 650 as the device (e.g., HE station 504 or HE AP 502) using the SR parameters 1600. In some embodiments the SRG OBSS PD max 1656 may be indicated as an offset from a reference value, e.g., an offset from OBSS_PD 1104 (FIG. 11) −82 (OBSS_PDMIN) or −62 dBM (OBSS_PDMAX 1106). SRG OBSS PD MAX 1656 may be used to determine OBSS_PDMAX 1106 for inter-BSS PPDUs 700 that are determined to be in the same management domain, SRG (908, 1008), and/or ESS 650.

In some embodiments, SRG BSS color bitmap 1658 may be the same or similar as SRG BSS colors 812, 912, 1012, or SRG BSS color bitmap 1302.

SRG partial BSSID bitmap 1660 may be similar or the same as BSSID range 1500, BSSID range of bits match 1550, BSSID list 1400, BSSID hashed index 1450, SRG partial BSSID bitmap 1475, SRG BSS BSSIDS 1214, and/or SRG BSS BSSIDS 814, 914, or 1014, and be part of SRG parameters 802 902, 1002, 1202, and/or SR parameters 710. 1200, 1600, 1700.

FIG. 17 illustrates SR parameters 1700 in accordance with some embodiments. SR parameters 1700 may be part of an information element. SR parameters 1700 may include element ID 1702, length 1704, element ID extension (not illustrated), SR control (not illustrated), non SRG OBSS PD max offset 1710, SRG OBSS PD min offset 1712, SRG OBSS PD max offset 1714, SRG BSS color bitmap 1716, and SRG partial BSSID bitmap 1718. SR parameters 1700 may include a field to indicate that one or more of the fields is not included in the SR parameters 1700. SR parameters 1700 may be similar or the same as SR parameters 710, 1200, 1600, 1700, SRG parameters 802, 902. 1002, 1202, and/or non-SRG parameters 810, 910, 1010, 1210. One or more of the fields of SR parameters 1700 may be included in SRG parameters 802, 902, 1002, 1202, SR parameters 710, 1200, 1600, 1700, and/or non-SRG parameters 810, 910, 1010 and 1210.

Element ID 1702 may be an identification of the SR parameters 1700 element. Length 1704 may be a length of SR parameters 1700. SR control may include information regarding whether or not one or more of the fields 1710, 1712, 1714, 1716, and/or 1718 is present or not. SR control may include information regarding whether or not SR parameters (SRP) transmissions are allowed or not.

Non SRG OBSS PD max offset 1710 may be an indication of a PD max for determining if SR can be used for inter-BSS PPDUs (e.g., 700) determined not to be in the same management domain, SRG (908, 1008), and/or ESS 650 as the device (e.g., HE station 504 or HE AP 502) using the SR parameters 1700. Non SRG OBSS PD max offset 1710 is indicated as an offset from a reference value, e.g., an offset from OBSS_PD 1104 (FIG. 11) −82 (OBSS_PDMIN) or −62 dBM (OBSS_PDMAX 1106), in accordance with some embodiments. Non SRG OBSS PD MAX Offset 1710 may be used to determine OBSS_PDMAX 1106 for OBSS PPDUs 700 that are determined not to be in the same management domain, SRG (e.g., 908, 1008), and/or ESS 650. Non SRG OBSS PD MAX Offset 1710 may be the same or similar to SRG OBSS TX max 1652.

SRG OBSS PD Min Offset 1712 may be the same or similar to SRG OBSS PD min 1654. SRG OBSS PD Min Offset 1712 may be an indication of a PD min for determining if SR can be used for inter-BSS PPDUs (e.g., 700) determined to be in the same management domain, SRG, and/or ESS as the device (e.g., HE station 504 or HE AP 502) using the SR parameters 1700. In some embodiments the SRG OBSS PD min offset 1712 is indicated as an offset from a reference value, e.g., an offset from OBSS_PD 1104 (FIG. 11) −82 (OBSS_PDMIN) or −62 dBM (OBSS_PD-MAX 1106). SRG OBSS PD Min Offset 17112 may be used to determine OBSS_PDMIN 1108 for OBSS PPDUs 700 that are determined to be in the same management domain, SRG, and/or ESS 650. In some embodiments, SRG OBSS PD Min Offset 1712 may be the same or similar to SRG OBSS PD min 1654.

SRG OBSS PD Max Offset 1714 may be the same or similar to SRG OBSS PD max 1656. SRG OBSS PD Max Offset 1714 may be an indication of a PD max for determining if SR can be used for OBSS PPDUs determined to be in the same management domain, SRG (e.g., 908, 1008), and/or ESS (e.g., 650) as the device (e.g., HE station 504 or HE AP 502) using the SR parameters 1700. In some embodiments the SRG OBSS PD Max Offset 1714 is indicated as an offset from a reference value, e.g., an offset from OBSS_PD 1104 (FIG. 11) −82 (OBSS_PDMIN) or −62 dBM (OBSS_PDMAX 1106). SRG OBSS PD Max Offset 1714 may be used to determine OBSS_PDMAX 1106 for OBSS PPDUs 700 that are determined to be in the same management domain, SRG (e.g., 908, 1008), and/or ESS 650.

In some embodiments, SRG BSS Color Bitmap 1716 may be the same or similar as SRG BSS color bitmap 1658, SRG BSS Color Bitmap 1302, SRG BSS Colors 1212, or SRG BSS Colors 812, 912, 1012.

In some embodiments, SRG partial BSSID bitmap 1718 may be the same or similar as SRG partial BSSID bitmap 1660, BSSID range 1500, BSSID Range of Bits Match 1550, SRG partial BSSID bitmap 1475, BSSID List 1400, BSSID Hashed Index 1450, SRG BSS BSSIDS 1214, or SRG BSS BSSIDS 814, 914, and 1014.

In some embodiments, SRG parameters 802, 902, 1002, 1202, SR parameters 710, 1200, 1600, 1700, and/or non-SRG parameters 810, 910, 1010, and 1210 may be included in beacons, probe responses, and/or association requests.

Figure 18:
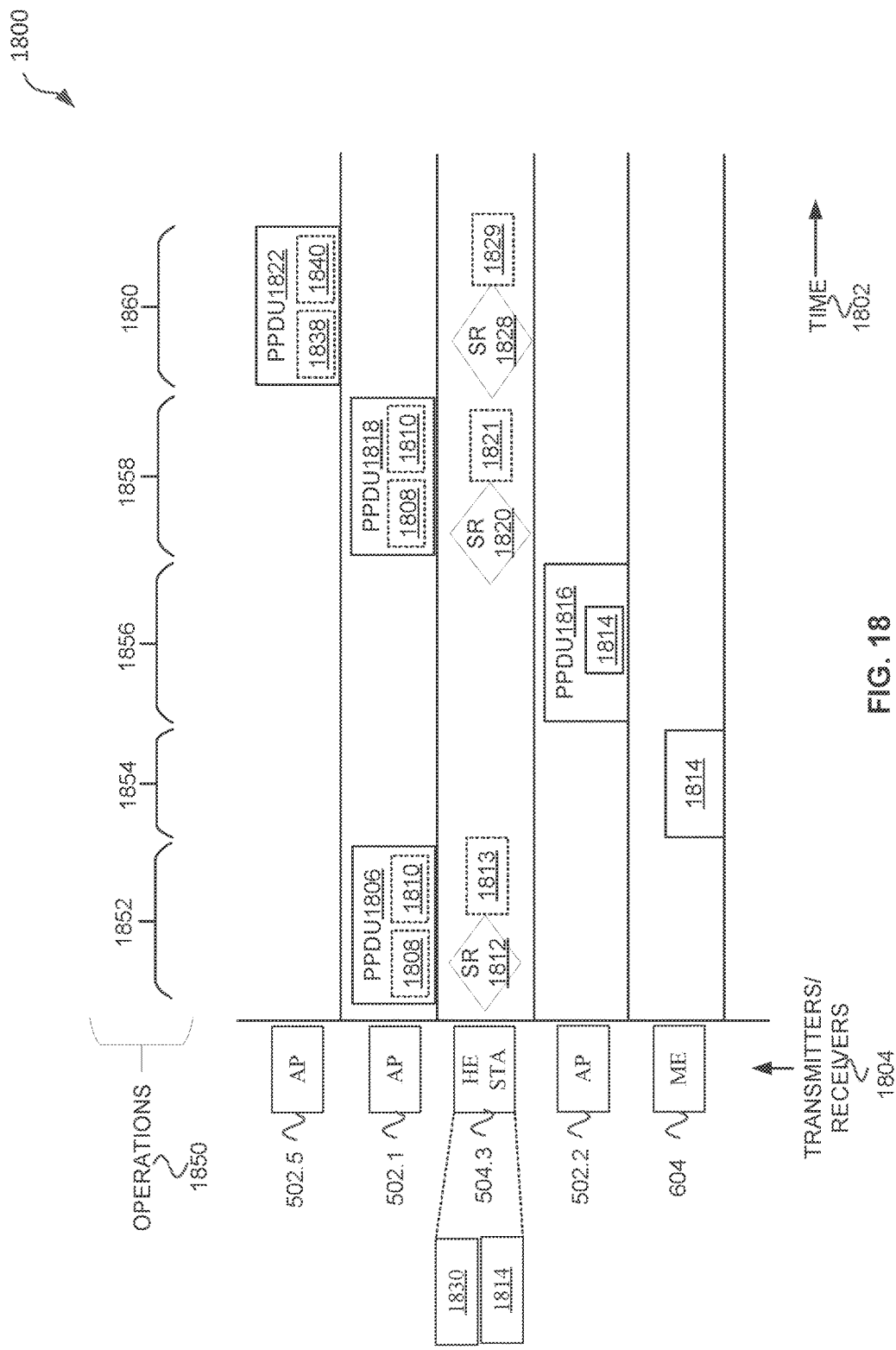
FIG. 18 illustrates a method of BSS identification for using non-default SR parameters in accordance with some embodiments.

FIG. 18 illustrates a method 1800 of BSS identification for using non-default SR parameters in accordance with some embodiments. Illustrated in FIG. 18 is time 1802 along a horizontal axis, transmitters/receivers 1804 along a vertical axis, and operations 1850 along the top.

HE STA 504.3 includes default SR parameters 1830 (e.g., non-SRG parameters 810, 910, 1010, 1210), and SR parameters 1814 (e.g., SRG parameters 802, 902, 1002, 1202, non-SRG parameters 810, 910, 1010, 1210, and/or SR parameters 710, 1200, 1600, 1700). The PPDUs 1806, 1818, may include a BSSID 1808 and/or BSS color 1810. The PPDU 1822 may include BSSID 1838, and BSS color 1840.

The method 1800 begins at operation 1852 with AP 502.1 transmitting PPDU 1806, and HE station 504.3 receiving the PPDU 1806, and determining (SR 1812) whether to use SR parameters 1814 or default SR parameters 1830, and whether it can transmit a PPDU 1813 using SR. HE station 504.3 may not have received SR parameters 1814 yet, so in accordance with some embodiments, HE station 504.3 determines to use default SR parameters 1830. Default SR parameters 1830 may include a TXP reference or max (e.g., 30 dBm), OBSS_PDMAX 1106, e.g., −62, and OBSS_PDMIN 1108, e.g., −82. In some embodiments, the default SR parameters 1830 (or part of the default SR parameters 1830) are part of an IEEE 802.11 communication standard. HE station 504.3 may determine not to use SR because the received energy level of PPDU 1806 is too high, so HE station 504.3 does not transmit PPDU 1813. In some embodiments, HE station 504.3 adjusts the default SR parameters 1830 and determines to use SR (and transmits PPDU 1813) based on raising the OBSS_PDMIN 1108 and lowering the TXP used to transmit PPDU 1813.

The method 1800 continues at operation 1854 with management entity 604 sending SR parameters 1814 to HE AP 502.2. In some embodiments, the AP 502.2 may generate the SR parameters 1814, and the management entity 604 does not send the SR parameters 1814 to the HE AP 502.2.

The method 1800 continues at operation 1856 with HE AP 502.2 transmitting PPDU 1816 to HE station 504.3. HE station 504.3 is associated with. HE AP 502.2 (see FIG. 6). HE station 504.3 decodes the SR parameters 1814.

The method 1800 continues at operation 1858 with HE AP 502.1 transmitting PPDU 1818, and HE station 504.3 receiving the PPDU 1818, and determining (SR 1820) whether to use SR parameters 1814 or default SR parameters 1830, and whether it can transmit PPDU 1821 using SR. HE station 504.3 may determine the BSSID 1808 of the PPDU 1818 based on one or more of the BSSID 704, RA 706, or TA 708 (FIG. 7). In some embodiments, the HE station 504.3 may determine the BSSID 1808 based on previous packets and stored addresses. HE station 504.3 may determine that the PPDU 1818 is an inter-BSS PPDU and that based on the BSSID 1808 and/or BSS color 1810 that the PPDU 1806 is from the same management domain, SRG (e.g., 908, 1008), and/or ESS, (e.g., ESS 1 650.1). For example, the SR parameters 1814 may include SRG BSS color bitmap 1716 and the bit corresponding to the BSS color 1810 may be set.

Additionally, SR parameters 1814 may include a SRG BSS BSSIDS 916, and the HE station 504.3 may determine from SRG BSS BSSIDS 916 that the inter-BSS PPDU 1818 is from the same management domain, SRG (e.g., 908, 1008), and/or ESS, (e.g., ESS 1 650.1), based on the BSSID 1808. Additionally, SR parameters 1814 may include a SRG Partial BSSIDS Bitmap 1475, and the HE station 504.3 may determine (e.g., as described in conjunction with FIG. 14C) from SRG Partial BSSIDS Bitmap 1475 that the OBSS PPDU 1818 is from the same management domain, SRG (e.g., 808, 1008), and/or ESS (e.g., 650), based on the BSSID 1808.

The HE station 504.3 may determine to use SR parameters 1814 as described herein. The HE station 504.3 may then determine whether to perform SR based on the SR parameters 1814. For example, HE station 504.3 may determine an OBSS_PDMAX 1106 based on SRG OBSS PD Max Offset 1714, and an OBSS_PDMIN 1108 based on SRG OBSS PD Min Offset 1712. The HE station 504.3 may then determine that it can adjust its TXP low enough (which enables a higher OBSS_PDmin 1108) to perform a SR and transmit PPDU 1821 while PPDU 1818 is still being received. The HE station 504.3 may adjust the SR parameters in a different way.

The method 1800 continues at operation 1860 with HE AP 502.5 transmitting PPDU 1822 with BSSID 1838 and BSS color 1840, and HE station 504.3 receiving the PPDU 1822, and determining (SR 1828) whether to use SR parameters 1814 or default SR parameters 1830, and whether it can transmit PPDU 1829 using SR.

HE station 504.3 may decode PPDU 1822, and may determine the BSSID 1838 and. BSS color 1840 as described herein. The SR parameters 1814 may include SRG BSS color bitmap 1716 and the bit corresponding to the BSS color 1838 may not be set. Additionally, SR parameters 1814 may include a SRG BSSIDS data structure 1718, and the HE station 504.3 may determine from SRG BSSIDS data structure 1718 that the OBSS PPDU 1818 is not from the same management domain, SRG (e.g., 808, 1008), and/or ESS (e.g., 650). Additionally, the HE station 504.3 may determine (e.g., as described in conjunction with FIG. 14C) from SRG Partial BSSIDS Bitmap 1475 that the inter-BSS PPDU 1818 is not from the same management domain, SRG (e.g., 808, 1008), and/or ESS (e.g., 650).

Based on the determination that PPDU 1822 is an inter-BSS PPDU 1822 not from the same management domain, SRG (e.g., 808, 1008), or ESS (e.g., 650) as HE station 104.3, HE station 104.3 uses the Default SR parameters 1830 to determine whether SR can be used to transmit PPDU 1829 while PPDU 1822 is being received. In some embodiments, HE STA 504.3 may determine based on the default SR parameters 1830 that SR can be used by adjusting the SR parameters. In some embodiments, HE STA 504.3 may determine based on the default SR parameters 1830 that SR cannot be use adjusting the SR parameters, or that the HE STA 504.3 does not want to adjust the SR parameters to enable SR.

In some embodiments, the HE STA 504.3 may determine whether SR may be used (e.g., SR 1812 and 1820) based on determining an SRG OBSS_PD if the inter-BSS PPDU (e.g. 1806, 1818) is in the same SRG (and optionally if the SR parameters 1814 have been received by the HE STA 504.3) as the HE STA 504.3. The SRG OBSS_PD may be determined based on SR parameters 1814, and the HE STA 504.3 adjusting the SRG OBSS_PD with the TXP (e.g., as described in conjunction with FIG. 11 with TXP 1102 and OBSS_PD 1104).

In some embodiments, the HE STA 504.3 may determine whether SR may be used based on determining an SRG OBSS_PD (e.g., OBSS_PDMIN 1108) if the inter-BSS PPDU (e.g, 1806, 1818) is in the same SRG (and optionally if the SR parameters 1.814 have been received by the HE STA 504.3) as the HE STA 504.3. The SRG OBSS_PD may be determined based on SR parameters 1814, and the HE STA 504.3 adjusting the SRG ORBS_PD with the TXP (e.g., as described in conjunction with FIG. 11 with TXP 1102 and OBSS_PD 1104).

In some embodiments, the HE STA 504.3 may determine whether SR may be used based on determining a SR OBSS_PD (OBSS_PDMIN 1108) if the inter-BSS PPDU (e.g, 1822) is not in the same SRG (and optionally if the SR parameters 1814 have been received by the HE STA 504.3) as the HE STA 504.3. The SR OBSS_PD may be determined based on default SR parameters 1830, and the HE STA 504.3 adjusting the SRG OBSS_PD with the TXT (e.g., as described in conjunction with FIG. 11 with TXP 1102 and OBSS_PD 1104).

Figure 19:
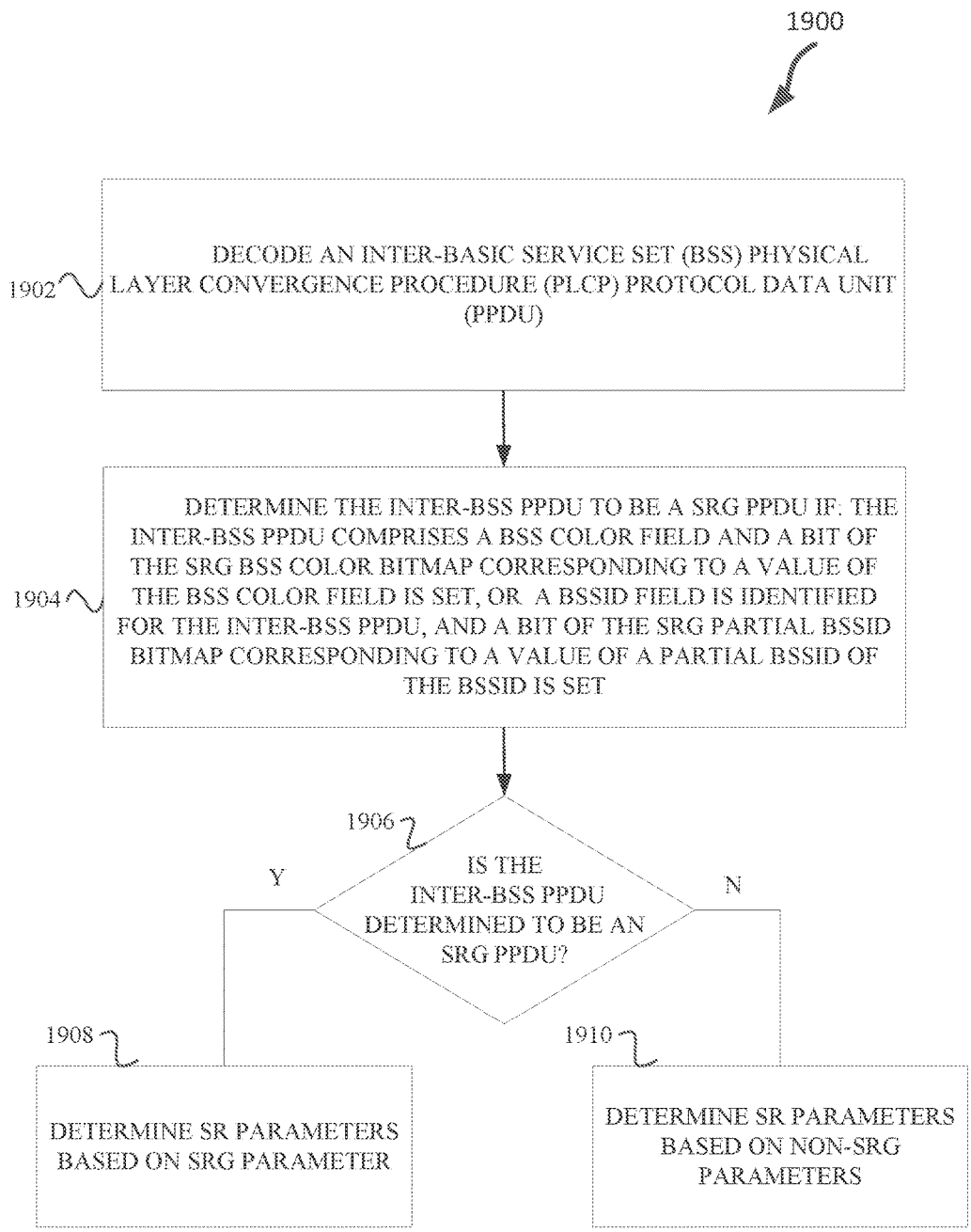
FIG. 19 illustrates a method for BSS identification for using non-default SR parameters in accordance with some embodiments.

FIG. 19 illustrates a method 1900 for BSS identification for using non-default SR parameters in accordance with some embodiments. The method 1900 begins at operation 1902 with decoding an inter-BSS PPDU comprising a BSS color field.

For example, HE station 504.3 of FIG. 18 may decode a PPDU 1806, 1818, or 1822. The method 1900 may continue with operation determining the inter-BSS PPDU to be a SRG PPDU if: the inter-BSS PPDU comprises a BSS color field and a bit of the SRG BSS color bitmap corresponding to a value of the BSS color field is set, or a BSSID field is identified for the inter-BSS PPDU, and a bit of the SRG Partial BSSID bitmap corresponding to a value of a partial BSSID of the BSSID is set. In some embodiments, the HE station 504 may be configured to determine a BSSID field as described herein. In some embodiments, the HE station 504 may be configured to determine a BSSID field as disclosed in one or more communications standards. In some embodiments, the HE station 504 may be configured to determine if the PPDU is an inter-BSS PPDU as disclosed herein. In some embodiments, the HE station 504 may be configured to determine if the PPDU is an inter-BSS PPDU as disclosed in one or more communication standards.

For example, HE station 504.3 may decode one of the PPDUs 1806, 1818, or 1822 and determine that the PPDU 1818 is an inter BSS, since access point 502.1 and access point 502.5 are both not part of BSS 500.2. HE station 504.3 may determine that the BSS color 1808 of PPDU 1818 is part of SRG BSS color bitmap 1716, SRG BSS color bitmap 1654, SRG BSS color bitmap 1302, SRG BSS colors 1212, or SRG BSS colors 912, because AP 502.1 is part of ESS 1 650.1 as is BSS 500.2, which HE station 504.3 is associated with. So, HE station 504.3 may determine the PPDU 1818 to be a SRG PPDU. HE station 504.3 may continue by determining whether SR can be used based on SRG SR parameters, and if so transmitting PPDU 1821 as disclosed in conjunction with FIG. 18.

In another example, HE station 504.3 may determine that the BSS color 1838 of PPDU 1822 is not part of SRG BSS color bitmap 1716, SRG BSS color bitmap 1654, SRG BSS color bitmap 1302, SRG BSS colors 1212, or SRG BSS colors 912, because HE AP 502.5 is not part of ESS 1 650.1 as is BSS 500.2, which HE station 504.3 is associated with. So, HE station 504.3 may not determine the PPDU 1818 to be a SRG PPDU. HE station 504.3 may continue by determining whether SR can be used using default SR parameters, and if so transmitting PPDU 1829 as disclosed in conjunction with FIG. 18.

In another example, HE station 504.3 may decode one of the PPDUs 1806, 1818, or 1822 and determine that the PPDU 1818 is an inter BSS (since access point 502.1 and access point 502.5 are both not part of BSS 500.2). HE station 504.3 may determine that the BSSID 1810 of PPDU 1818 is indicated as part of a same SRG as the HE station 504.3 based on using SRG BSSID data structure 1718, SRG BSSID indication 1656, BSSID range 1500, BSSID range of bits match 1550, SRG partial BSSID bitmap 1475, BSSID hashed index 1450, BSSID list 1400, SRG BSS BSSIDS 1214, SRG BSS BSSIDS 914, or anther data structure. So, HE station 504.3 may determine the PPDU 1818 to be a SRG PPDU.

In another example, HE station 504.3 may determine that the BSSID 1840 of PPDU 1822 is indicated as not part of a same SRG as the HE station 504.3 based on using SRG BSSID data structure 1718, SRG BSSID indication 1656, BSSID range 1500, BSSID range of bits match 1550, BSSID hashed index 1450, BSSID list 1400, SRG partial BSSID bitmap 1475, SRG BSS BSSIDS 1214, SRG BSS BSSIDS 914, or anther data structure. So, HE station 504.3 may not determine the PPDU 1822 to be a SRG PPDU. In some embodiments, the BSSID may be determined based on previous PPDUs received or information from a management entity or FIE AP 504, so that the inter-BSS PPDU may be termed to comprise a BSSID, if the HE station 504 and/or HE AP 502 can determine the BSSID of the inter-BSS PPDU.

The method 1900 continues at operation 1906 with is the inter-BSS PPDU the SRG PPDU. For example, the HE STA 504 and/or HE AP 502 may determine whether the inter-BSS PPDU is the SRG PPDU based on BSS color field or a BSSID field. If the inter-BSS PPDU is the SRG PPDU, then the method 1900 continues at operation 1908 with if the inter-BSS PPDU is determined to be the SRG PPDU, determine SR parameters based on SRG parameters.

For example, HE STA 504.3 (FIG. 18) may determine that PPDU 1818 is the SRG PPDU, and determine SR parameters based on SR parameters 1814. Optionally, the HE STA 504.3 may then determine whether to use SR, and if it is determined to use SR, transmit PPDU 1821 while still receiving PPDU 1818.

If the inter-BSS PPDU is not determined to be the SRG PPDU, then the method 1900 continues at operation 1910 with if the inter-BSS PPDU is determined to be the SRG PPDU, determine SR parameters based on non-SRG parameters.

For example, HE STA 504.3 (FIG. 18) may determine that PPDU 1822 is not the SRG PPDU, and determine SR parameters based on non-SRG parameters 1830. Optionally, the HE STA 504.3 may then determine whether to use SR, and if it is determined to use SR, transmit PPDU 1829 while still receiving PPDU 1822. An apparatus of the HE station 504 and/or HE AP 502 may perform one or more of the above operations.

Figure 20:
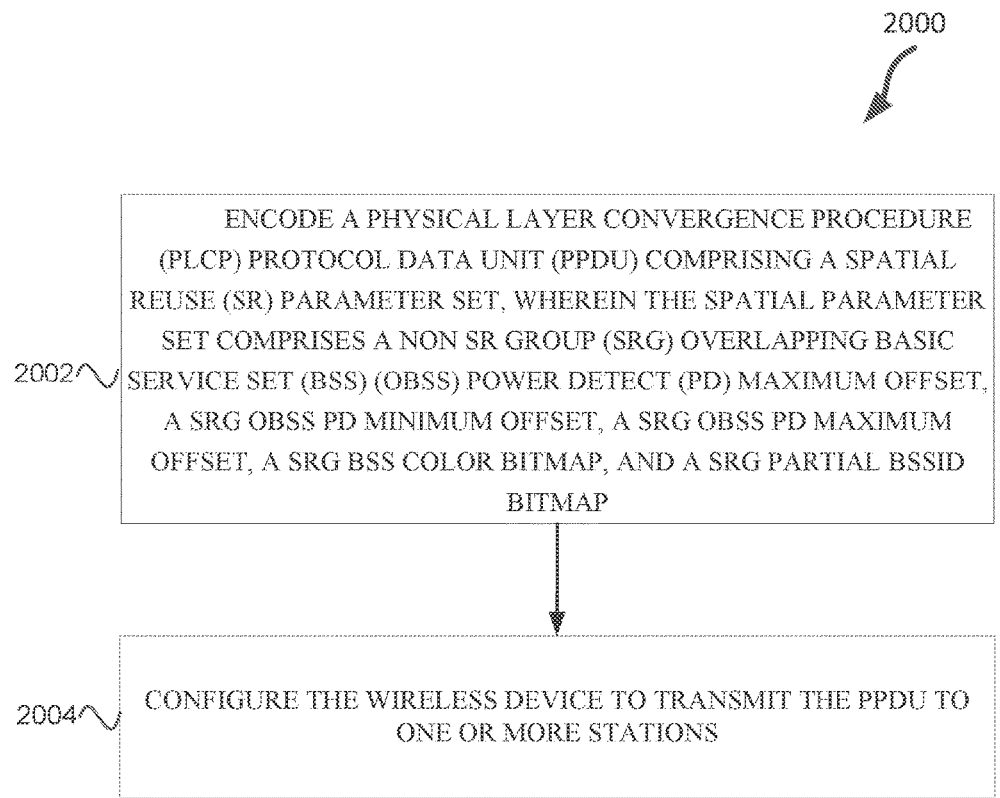
FIG. 20 illustrates a method for BSS identification for using non-default SR parameters in accordance with some embodiments.

FIG. 20 illustrates a method 2000 for BSS identification for using non-default SR parameters in accordance with some embodiments. The method 2000 may begin at operation 2002 with encoding a PPDU comprising a SR parameter set, wherein the spatial parameter set comprises a non SRG OBSS PD maximum offset, a SRG OBSS PD minimum offset, a SRG OBSS PD maximum offset, a SRG BSS color bitmap, and a SRG BSSID data structure.

For example, HE AP 502.2 may encode PPDU 1816 to include SR parameters 1814 (e.g., SR parameters 1700, 1600, 1200, 1000, 900, 800, 710).

The method 2000 continues at operation 2004 with configuring the wireless device to transmit the PPDU to one or more stations. For example, the HE AP 502.2 may transmit the PPDU 1816 to HE station 504.3, e.g., as an information element. An apparatus of the HE station 504 and/or HE AP 502 may perform one or more of the above operations.

Figure 21:
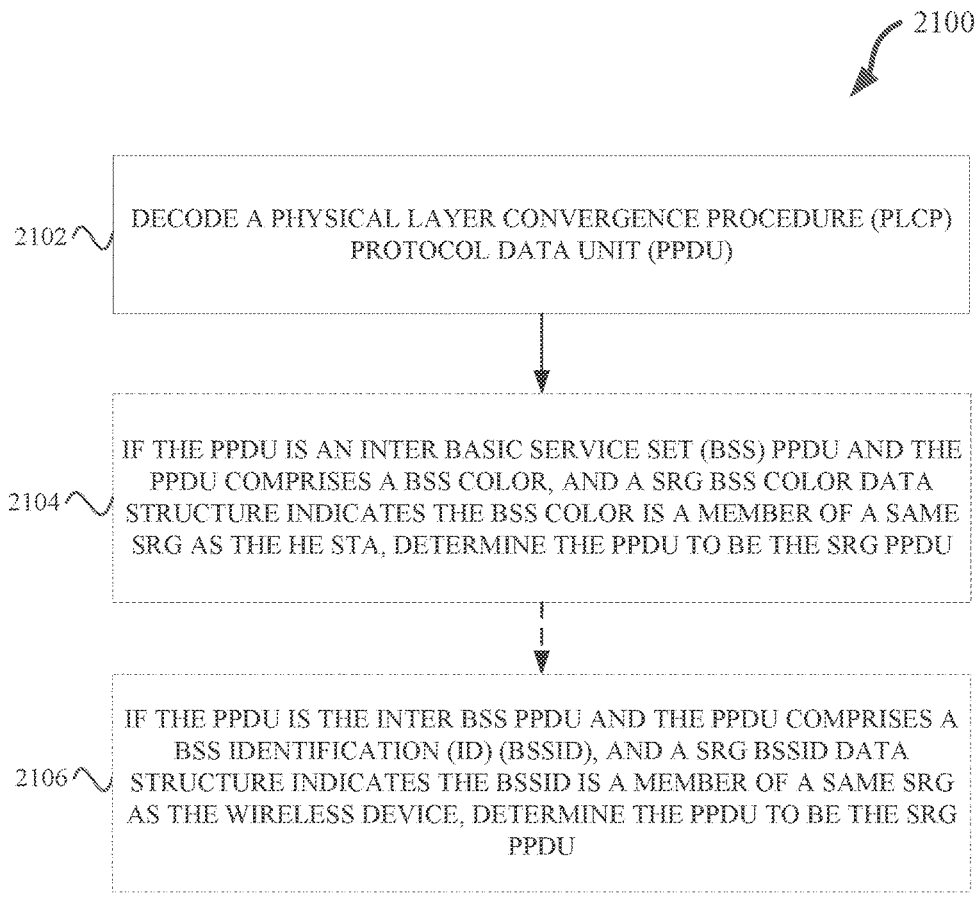
FIG. 21 illustrates a method for BSS identification for using non-default SR parameters in accordance with some embodiments.

FIG. 21 illustrates a method 2100 for BSS identification for using non-default SR parameters in accordance with some embodiments. The method 2100 begins at operation 2102 with decoding PPDU. For example, HE station 504.3 of FIG. 18 may decode a PPDU 1806, 1818, or 1822.

The method 2100 continues, optionally, at operation 2104 with if the PPDU is an inter-BSS PPDU and the PPDU comprises a BSS color, and a SRG BSS color data structure indicates the color is a member of a same SRG as the HE STA, determine the PPDU to be the SRG PPDU.

For example, HE station 504.3 of FIG. 18 may decode a PPDU 1806, 1818, or 1822. For example, HE station 504.3 may decode one of the PPDUs 1806, 1818, or 1822 and determine that the PPDU 1818 is an inter BSS (since access point 502.1 and access point 502.5 are both not part of BSS 500.2). HE station 504.3 may determine that the BSS color 1808 of PPDU 181.8 is part of SRG BSS color bitmap 1716, SRG BSS color bitmap 1654, SRG BSS color bitmap 1302, SRG BSS colors 1212, or SRG BSS colors 912, because AP 502.1 is part of ESS 1 650.1 as is BSS 500.2, which HE station 504.3 is associated with. So, HE station 504.3 may determine the PPDU 1818 to be a SRG PPDU. HE station 504.3 may continue by determining whether SR can be used based on SRG SR parameters, and if so transmitting PPDU 1821 as disclosed in conjunction with FIG. 18.

In another example, HE station 504.3 may determine that the BSS color 1838 of PPDU 1822 is not part of SRG BSS color bitmap 1716. SRG BSS color bitmap 1654, SRG BSS color bitmap 1302, SRG BSS colors 1212, or SRG BSS colors 912, because HE AP 502.5 is not part of ESS 1 650.1 as is BSS 500.2, which HE station 504.3 is associated with. So, HE station 504.3 may not determine the PPDU 1818 to be a SRG PPDU. HE station 504.3 may continue by determining whether SR can be used using default SR parameters, and if so transmitting PPDU 1829 as disclosed in conjunction with FIG. 18.

The method 2100 continues, optionally, at operation 2106 with if the PPDU is the inter BSS PPDU and the PPDU comprises a BSSID, and a SRG BSSID data structure indicates the BSSID is a member of a same SRG as the wireless device, determine the PPDU to be the SRG PPDU.

For example, HE station 504.3 may decode one of the PPDUs 1806, 1818, or 1822 and determine that the PPDU 1818 is an inter BSS (since access point 502.1 and access point 502.5 are both not part of BSS 500.2. HE station 504.3 may determine that the BSSID 1810 of PPDU 1818 is indicated as part of a same SRG as the HE station 504.3 based on using SRG BSSID data structure 1718, SRG BSSID indication 1656, BSSID range 1500, BSSID range of bits match 1550, SRG partial BSSID bitmap 1475, BSSID hashed index 1450, BSSID list 1400, SRG BSS BSSIDS 1214, SRG BSS BSSIDS 914, or anther data structure. So, HE station 504.3 may determine the PPDU 1818 to be a SRG PPDU. HE station 504.3 may continue by determining whether SR can be used by using SRG SR parameters, and if so transmitting PPDU 1821 as disclosed in conjunction with FIG. 18.

In another example, HE station 504.3 may determine that the BSSID 1840 of PPDU 1822 is indicated as not part of a same SRG as the HE station 504.3 based on using SRG BSSID data structure 1718, SRG BSSID indication 1656, BSSID range 1500, BSSID range of bits match 1550, BSSID hashed index 1450, BSSID list 1400, SRG partial BSSID bitmap 1475, SRG BSS BSSIDS 1214, SRG BSS BSSIDS 914, or anther data structure. So, HE station 504.3 may not determine the PPDU 1822 to be a SRG PPDU. HE station 504.3 may continue by determining whether SR can be used by using default SR parameters, and if so transmitting PPDU 1829 as disclosed in conjunction with FIG. 18. An apparatus of the HE station 504 and/or HE AP 502 may perform one or more of the above operations.

In some embodiments, the method 2100 may include only one of operation 2104 and operation 2106. In some embodiments, the method 2100 includes both operation 2104 and operation 2106.

Figure 22:
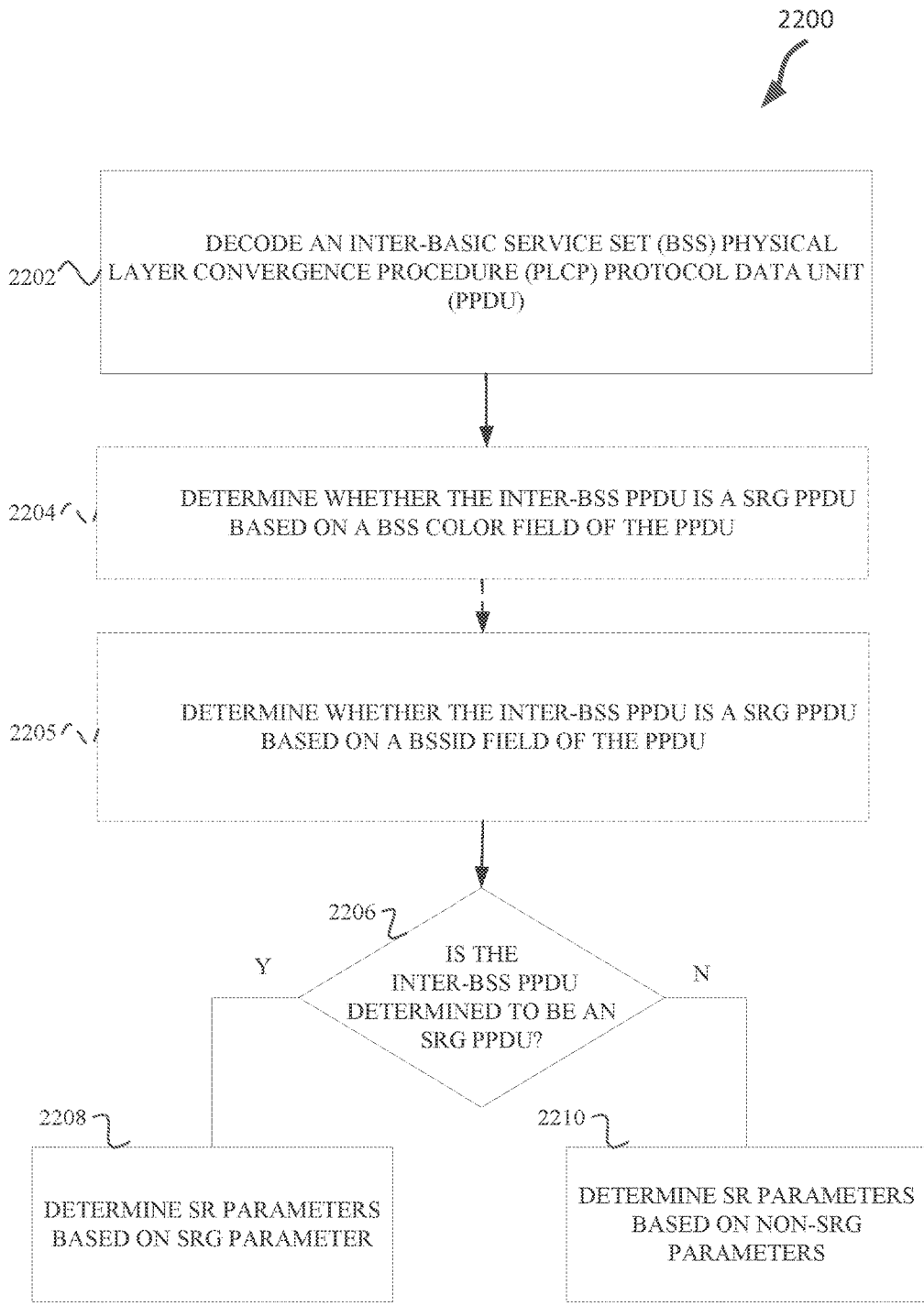
FIG. 22 illustrates a method for BSS identification for using non-default SR parameters in accordance with some embodiments.

FIG. 22 illustrates a method 2200 for BSS identification for using non-default SR parameters in accordance with some embodiments. The method 2200 begins at operation 2202 with decoding an inter-BSS PPDU.

For example, HE station 504.3 of FIG. 18 may decode a PPDU 1806, 1818, or 1822. The method 2200 continues, optionally, with operation 2204 determining whether the inter-BSS PPDU is a SRG PPDU based on a BSS color field of the PPDU.

In some embodiments, the HE station 504 may be configured to determine a BSSID field as described herein. In some embodiments, the HE station 504 may be configured to determine a BSSID field as disclosed in one or more communications standards. In some embodiments, the HE station 504 may be configured to determine if the PPDU is an inter-BSS PPDU as disclosed herein. In some embodiments, the HE station 504 may be configured to determine if the PPDU is an inter-BSS PPDU as disclosed in one or more communication standards.

For example, HE station 504.3 may decode one of the PPDUs 1806, 1818, or 1822 and determine that the PPDU 1818 is an inter BSS, since access point 502.1 and access point 502.5 are both not part of BSS 500.2. HE station 504.3 may determine that the BSS color 1808 of PPDU 1818 is part of SRG BSS color bitmap 1716, SRG BSS color bitmap 1654, SRG BSS color bitmap 1302, SRG BSS colors 1212, or SRG BSS colors 912, because AP 502.1 is part of ESS 1 650.1 as is BSS 500.2, which HE station 504.3 is associated with. So, HE station 504.3 may determine the PPDU 1818 to be a SRG PPDU. HE station 504.3 may continue by determining whether SR can be used based on SRG SR parameters, and if so transmitting PPDU 1821 as disclosed in conjunction with FIG. 18.

In another example, HE station 504.3 may determine that the BSS color 1838 of PPDU 1822 is not part of SRG BSS color bitmap 1716. SRG BSS color bitmap 1654, SRG BSS color bitmap 1302, RIG BSS colors 1212, or SRG BSS colors 912, because HE AP 502.5 is not part of ESS 1 650.1 as is BSS 500.2, which HE station 504.3 is associated with.

So, HE station 504.3 may not determine the PPDU 1818 to be a SRG PPDU. HE station 504.3 may continue by determining whether SR can be used using default SR parameters, and if so transmitting PPDU 1829 as disclosed in conjunction with FIG. 18.

The method 2200 continues, optionally, at operation 2205 with determining whether the inter-BSS PPDU is a SRG PPDU based on a BSSID field of the PPDU. For example, HE station 504.3 may decode one of the PPDUs 1806, 1818, or 1822 and determine that the PPDU 1818 is an inter BSS (since access point 502.1 and access point 502.5 are both not part of BSS 500.2). HE station 504.3 may determine that the BSSID 1810 of PPDU 1818 is indicated as part of a same SRG as the HE station 504.3 based on using SRG BSSID data structure 1718, SRG BSSID indication 1656, BSSID range 1500, BSSID range of bits match 1550, SRG partial BSSID bitmap 1475, BSSID hashed index 1450, BSSID list 1400, SRG BSS BSSIDS 1214, SRG BSS BSSIDS 914, or anther data structure. So, HE station 504.3 may determine the PPDU 1818 to be a SRG PPDU.

In another example, HE station 504.3 may determine that the BSSID 1840 of PPDU 1822 is indicated as not part of a same SRG as the HE station 504.3 based on using SRG BSSID data structure 1718, SRG BSSID indication 1656, BSSID range 1500, BSSID range of bits match 1550, BSSID hashed index 1450, BSSID list 1400, SRG partial BSSID bitmap 1475, SRG BSS BSSIDS 1214, SRG BSS BSSIDS 914, or anther data structure. So, HE station 504.3 may not determine the PPDU 1822 to be a SRG PPDU. In some embodiments, the BSSID may be determined based on previous PPDUs received or information from a management entity or HE AP 504, so that the inter-BSS PPDU may be termed to comprise a BSSID, if the HE station 504 and/or HE AP 502 can determine the BSSID of the inter-BSS PPDU.

The method 2200 continues at operation 2206 with is the inter-BSS PPDU the SRG PPDU. For example, the HE STA 504 and/or HE AP 502 may determine whether the inter-BSS PPDU is the SRG PPDU based on BSS color field or a BSSID field. If the inter-BSS PPDU is the SRG PPDU, then the method 2200 continues at operation 2208 with if the inter-BSS PPDU is determined to be the SRG PPDU, determine SR parameters based on SRG parameters.

For example, HE STA 504.3 (FIG. 18) may determine that PPDU 1818 is the SRG PPDU, and determine SR parameters based on SR parameters 1814. Optionally, the HE STA 504.3 may then determine whether to use SR, and if it is determined to use SR, transmit PPDU 1821 while still receiving PPDU 1818.

If the inter-BSS PPDU is not determined to be the SRG PPDU, then the method 2200 continues at operation 2210 with if the inter-BSS PPDU is determined to be the SRG PPDU, determine SR parameters based on non-SRG parameters.

For example, HE STA 504.3 (FIG. 18) may determine that PPDU 1822 is not the SRG PPDU, and determine SR parameters based on non-SRG parameters 1830. Optionally, the HE STA 504.3 may then determine whether to use SR, and if it is determined to use SR, transmit PPDU 1829 while still receiving PPDU 1822. An apparatus of the HE station 504 and/or HE AP 502 may perform one or more of the above operations. In some embodiments, method 2200 includes only one of operation 2204 and operation 2205. In some embodiments, method 2200 includes both operation 2204 and operation 2205.

Figure 23:
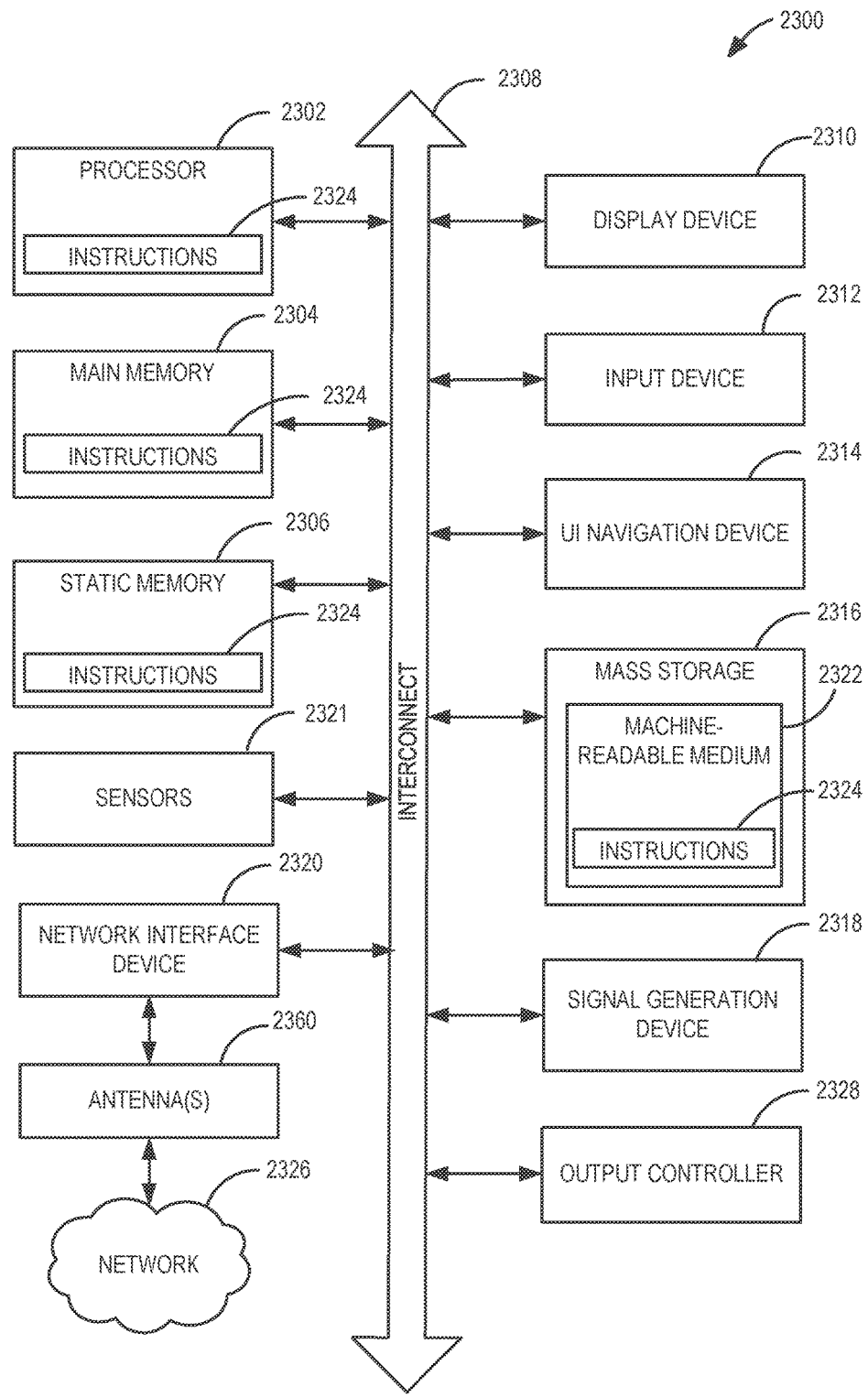
FIG. 23 illustrates a block diagram of an example machine upon which any one or more of the techniques (e.g., methodologies) discussed herein may perform.

FIG. 23 illustrates a block diagram of an example machine 2300 upon which any one or more of the techniques (e.g., methodologies) discussed herein may perform. In alternative embodiments, the machine 2300 may operate as a standalone device or may be connected (e.g., networked) to other machines. In a networked deployment, the machine 2300 may operate in the capacity of a server machine, a client machine, or both in server-client network environments. In an example, the machine 2300 may act as a peer machine in peer-to-peer (P2P) (or other distributed) network environment. The machine 2300 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 2300 may include a hardware processor 2302 (e.g., a central processing unit (CPU), a graphics processing unit (GPU), a hardware processor core, or any combination thereof), a main memory 2304 and a static memory 2306, sonic or all of which may communicate with each other via an interlink (e.g., bus) 2308.

Specific examples of main memory 2304 include Random Access Memory (RAM), and semiconductor memory devices, which may include, in some embodiments, storage locations in semiconductors such as registers. Specific examples of static memory 2306 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 2300 may further include a display device 2310, an input device 2312 (e.g., a keyboard), and a user interface (UI) navigation device 2314 (e.g., a mouse). In an example, the display device 2310, input device 2312 and UT navigation device 2314 may be a touch screen display. The machine 2300 may additionally include a mass storage (e.g., drive unit) 2316, a signal generation device 2318 (e.g., a speaker), a network interface device 2320, and one or more sensors 2321, such as a global positioning system (GPS) sensor, compass, accelerometer, or other sensor. The machine 2300 may include an output controller 2328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 2302 and/or instructions 2324 may comprise processing circuitry and/or transceiver circuitry.

The storage device 2316 may include a machine readable medium 2322 on which is stored one or more sets of data structures or instructions 2324 (e.g., software) embodying or utilized by any one or more of the techniques or functions described herein. The instructions 2324 may also reside, completely or at least partially, within the main memory 2304, within static memory 2306, or within the hardware processor 2302 during execution thereof by the machine 2300. In an example, one or any combination of the hardware processor 2302, the main memory 2304, the static memory 2306, or the storage device 2316 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD ROM disks.

While the machine readable medium 2322 is illustrated as a single medium, the term "machine readable medium" may include a single medium or multiple media (e.g., a centralized or distributed database, and/or associated caches and servers) configured to store the one or more instructions 2324.

An apparatus of the machine 2300 may be one or more of a hardware processor 2302 (e.g., a central processing unit (CPU), a graphics processing unit (GPU), a hardware processor core, or any combination thereof), a main memory 2304 and a static memory 2306, sensors 2321, network interface device 2320, antennas 2360, a display device 2310, an input device 2312, a UI navigation device 2314, a mass storage 2316, instructions 2324, a signal generation device 2318, and an output controller 2328. The apparatus may be configured to perform one or more of the methods and/or operations disclosed herein. The apparatus may be intended as a component of the machine 2300 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 2300 and that cause the machine 2300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash in memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 2324 may further be transmitted or received over a communications network 2326 using a transmission medium via the network interface device 2320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 2320 may include one or more physical jacks (e.g., Ethernet, coaxial, or phone jacks) or one or more antennas to connect to the communications network 2326. In an example, the network interface device 2320 may include one or more antennas 2360 to wirelessly communicate using at least one of single-input multiple-output (SIMO), multiple-input multiple-output (MIMO), or multiple-input single-output (MISO) techniques. In some examples, the network interface device 2320 may wirelessly communicate using Multiple User MIMO techniques. The term "transmission medium" shall be taken to include any intangible medium that is capable of storing, encoding or carrying instructions for execution by the machine 2300, and includes digital or analog communications signals or other intangible medium to facilitate communication of such software.

Figure 24:
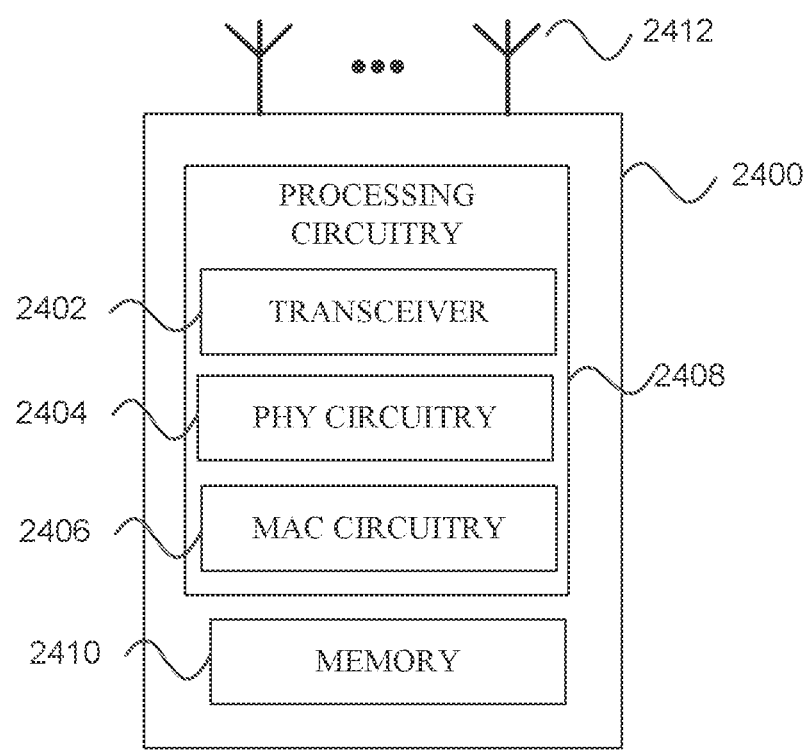
FIG. 24 illustrates a block diagram of an example wireless device upon which any one or more of the techniques (e.g., methodologies or operations) discussed herein may perform.

FIG. 24 illustrates a block diagram of an example wireless device 2400 upon which any one or more of the techniques (e.g., methodologies or operations) discussed herein may perform. The wireless device 2400 may be a HE device. The wireless device 2400 may be a HE STA 504 and/or HE AP 502 (e.g., FIG. 5). A HE STA 504 and/or HE AP 502 may include some or all of the components shown in FIGS. 1-5 and 23. The wireless device 2400 may be an example machine 2400 as disclosed in conjunction with FIG. 23.

The wireless device 2400 may include processing circuitry 2408. The processing circuitry 2408 may include a transceiver 2402, physical layer circuitry (PHY circuitry) 2404, and MAC layer circuitry (MAC circuitry) 2406, one or more of which may enable transmission and reception of signals to and from other wireless devices 2400 (e.g., HE AP 502, HE STA 504, and/or legacy devices 506) using one or more antennas 2412. As an example, the PHY circuitry 2404 may perform various encoding and decoding functions that may include formation of baseband signals for transmission and decoding of received signals. As another example, the transceiver 2402 may perform various transmission and reception functions such as conversion of signals between a baseband range and a Radio Frequency (RF) range.

Accordingly, the PHY circuitry 2404 and the transceiver 2402 may be separate components or may be part of a combined component, e.g., processing circuitry 2408. In addition, some of the described functionality related to transmission and reception of signals may be performed by a combination that may include one, any or all of the PHY circuitry 2404 the transceiver 2402, MAC circuitry 2406, memory 2410, and other components or layers. The MAC circuitry 2406 may control access to the wireless medium. The wireless device 2400 may also include memory 2410 arranged to perform the operations described herein, e.g., some of the operations described herein may be performed by instructions stored in the memory 2410.

The antennas 2412 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 2412 may be effectively separated to take advantage of spatial diversity and the different channel characteristics that may result.

One or more of the memory 2410, the transceiver 2402, the PHY circuitry 2404, the MAC circuitry 2406, the antennas 2412, and/or the processing circuitry 2408 may be coupled with one another. Moreover, although memory 2410, the transceiver 2402, the PHY circuitry 2404, the MAC circuitry 2406, the antennas 2412 are illustrated as separate components, one or more of memory 2410, the transceiver 2402, the circuitry 2404, the MAC circuitry 2406, the antennas 2412 may be integrated in an electronic package or chip.

In some embodiments, the wireless device 2400 may be a mobile device as described in conjunction with FIG. 23. In some embodiments the wireless device 2400 may be configured to operate in accordance with one or more wireless communication standards as described herein as described in conjunction with FIGS. 1-5 and FIG. 23, IEEE 802.11). In some embodiments, the wireless device 2400 may include one or more of the components as described in conjunction with FIG. 23 (e.g., display device 2310, input device 2312, etc.) Although the wireless device 2400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 2400 may include various components of the wireless device 2400 as shown in FIG. 23 and/or components from FIGS. 1-5 and FIG. 23. Accordingly, techniques and operations described herein that refer to the wireless device 2400 may be applicable to an apparatus for a wireless device 2400 (e.g., HE AP 502 and/or HE STA 504), in some embodiments. In some embodiments, the wireless device 2400 is configured to decode and/or encode signals, packets, and/or frames as described herein, e.g., PPDUs.

In some embodiments, the MAC circuitry 2406 may be arranged to contend for a wireless medium during a contention period to receive control of the medium for a HE TXOP and encode or decode an HE PPDU. In some embodiments, the MAC circuitry 2406 may be arranged to contend for the wireless medium based on channel contention settings, a transmitting power level, and a clear channel assessment level (e.g., an energy detect level).

The PHY circuitry 2404 may be arranged to transmit signals in accordance with one or more communication standards described herein. For example, the PHY circuitry 2404 may be configured to transmit a HE PPDU. The PHY circuitry 2404 may include circuitry for modulation/demodulation, upconversion/downconversion, filtering, amplification, etc. In some embodiments, the processing circuitry 2408 may include one or more processors. The processing circuitry 2408 may be configured to perform functions based on instructions being stored in a RAM or ROM, or based on special purpose circuitry. The processing circuitry 2408 may include a processor such as a general purpose processor or special purpose processor. The processing circuitry 2408 may implement one or more functions associated with antennas 2412, the transceiver 2402, the PHY circuitry 2404, the MAC circuitry 2406, and/or the memory 2410. In some embodiments, the processing circuitry 2408 may be configured to perform one or more of the functions/operations and/or methods described herein.

In mmWave technology, communication between a station (e.g., the HE stations 504 of FIG. 5 or wireless device 2400) and an access point (e.g., the HE AP 502 of FIG. 5 or wireless device 2400) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device m order to compensate for significant energy loss in the channel between the two communicating devices. Using directed transmission may extend the range of the millimeter-wave communication versus utilizing the same transmitted energy in omni-directional propagation.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media optical storage media; flash memory, etc.

Example embodiments have the technical effect of reducing the amount of time a HE STA 504 and/or HE AP 502 requires to determine whether or not a PPDU is a SRG PPDU, which may enable the HE STA 504 and/or HE AP 502 to determine whether SR is possible sooner.

The following examples pertain to further embodiments. Example 1 is an apparatus of a high-efficiency (HE) station (STA) (HE STA) including: memory configured to store one or more bitmaps including at least one of a spatial reuse (SR) group (SRG) basic service set (BSS) color bitmap and a SRG Partial BSS identification (ID)(BSSID) Bitmap, and processing circuitry coupled to the memory, the processing circuitry configured to: decode an inter-BSS physical layer convergence procedure (PLCP) protocol data unit (PPDU); determine the inter-BSS PPDU to be a SRG PPDU if: the inter-BSS PPDU comprises a BSS color field and a bit of the SRG BSS color bitmap corresponding to a value of the BSS color field is set; or a BSSID field is identified for the inter-BSS PPDU, and a bit of the SRG Partial BSSID bitmap corresponding to a value of a partial BSSID of the BSSID is set; if the inter-BSS PPDU is determined to be the SRG PPDU, determine SR parameters based on SRG parameters; and if the inter-BSS PPDU is not determined to be the SRG PPDU, determine SR parameters based on non-SRG parameters.

In Example 2, the subject matter of Example 1 optionally includes where the processing circuitry is further configured to: determine the value of the partial BSSID to be a value of bits 39 through 44 of the BSSID.

In Example 3, the subject matter of any one or more of Examples 1-2 optionally include where the BSS color bitmap is eight octets and the SRG partial BSSID bitmap is eight octets.

In Example 4, the subject matter of any one or more of Examples 1-3 optionally include where the processing circuitry is further configured to: decode a spatial reuse parameter set, where the spatial parameter set comprises a non SRG overlapping BSS (OBSS) PD maximum offset, a SRG OBSS PD minimum offset, a SRG OBSS PD maximum offset, the SRG BSS color bitmap, and the SRG Partial BSSID Bitmap.

In Example 5, the subject matter of Example 4 optionally includes where the non-SRG parameters comprise the non SRG overlapping OBSS PD maximum offset, and the SRG parameters comprise the SRG OBSS PD minimum offset, and the SRG OBSS PD maximum.

In Example 6, the subject matter of any one or more of Examples 1-5 optionally include where the processing circuitry is further configured to: if the HE STA has not received a spatial reuse parameter set including the SRG BSS color bitmap or the SRG Partial BSSID) Bitmap, determine SR parameters based on non-SRG parameters.

In Example 7, the subject matter of any one or more of Examples 1-6 optionally include where the processing circuitry is further configured to: if the PPDU is the SRG PPDU, determine whether to use SR based on the SR parameters, and if the PPDU is not determined to be the SRG PPDU, determine whether to use SR based on the non-SRG parameters.

In Example 8, the subject matter of Example 7 optionally includes where the processing circuitry is further configured to: if SR is determined to be used, encode a PPDU, and configure the HE station to begin to transmit the PPDU before the inter-BSS PPDU is finished being received by the HE STA.

In Example 9, the subject matter of any one or more of Examples 1-8 optionally include where the processing circuitry is further configured to: decode a PPDU; determine whether the PPDU is the inter-BSS PPDU; and if the PPDU is not the inter-BSS PPDU, determine not to perform SR.

In Example 10, the subject matter of any one or more of Examples 1-9 optionally include where the processing circuitry is further configured to: set the bit corresponding to the value of the BSS color field of the SRG BSS color bitmap to a value of 1 to indicate the bit is set, and to the value of 0 to indicate the bit is not set; and set the bit corresponding to the value of the partial BSSID of the SRG Partial BSSID Bitmap to the value of 1 to indicate the bit is set, and to the value of 0 to indicate the bit is not set.

In Example 11, the subject matter of any one or more of Examples 1-10 optionally include a value of 1 indicates a bit is set and a value of 0 indicates a bit is not set.

In Example 12, the subject matter of any one or more of Examples 1-10 optionally include where a SRG is one or more from the following group: one or more BSSs in an extended service set (ESS); one or more BSSs, and the access points and stations associated with the one or more BSSs; and, access points and stations in a same management domain, where the access points and stations are each one from the following group: an Institute of Electrical and Electronic Engineers (IEEE) 802.11ax access point, an IEEE 802.11ax station, an IEEE 802.11 station, and an IEEE 802.11 access point.

In Example 13, the subject matter of any one or more of Examples 1-12 optionally include wherein the processing circuitry is further configured to: determine the value of the partial BSSID to be a value of one or snore bits of the BSSID.

In Example 14, the subject matter of any one or more of Examples 1-13 optionally include where the HE STA is one from the following group: an Institute of Electrical and Electronic Engineers (IEEE) 802. 11ax access point, an IEEE 802.11ax station, an IEEE 802.11 station, and an IEEE 802.11 access point.

In Example 15, the subject matter of any one or more of Examples 1-14 optionally include transceiver circuitry coupled to the processing circuitry; and, one or more antennas coupled to the transceiver circuitry.

Example 16 is a non-transitory computer-readable storage medium that stores instructions for execution by one or more processors, the instructions to configure the one or more processors to cause a high-efficiency (HE) station (STA) to: decode a physical layer convergence procedure (PLCP) protocol data unit (PPDU); if the PPDU is an inter basic service set (BSS) PPDU and the PPDU comprises a BSS color field, and if a SRG BSS color data structure indicates a value of the BSS color field is a member of a same SRG as the HE STA, determine the PPDU to be the SRG PPDU; and if the PPDU is the inter BSS PPDU and the PPDU comprises a BSS identification (ID) (BSSID), and a SRG BSSID data structure indicates the BSSID is a member of the same SRG as the HE STA, determine the PPDU to be the SRG PPDU.

In Example 17, the subject matter of Example 16 optionally includes where the instructions further configure the one or more processors to cause the HE STA to: if the PPDU is determined to be the SRG PPDU, determine whether to use SR based on a SRG spatial reuse parameter set.

in Example 18, the subject matter of any one or more of Examples 16-17 optionally include where the instructions further configure the one or more processors to cause the HE STA to: if the PPDU is the inter-BSS PPDU, and the PPDU comprises the BSS color field, and if a bit corresponding to the value of the BSS color field of a SRG BSS color bitmap is 1, determine the inter-BSS PPDU to be the SRG PPDU).

In Example 19, the subject matter of any one or more of Examples 16-18 optionally include where the instructions further configure the one or more processors to cause the HE STA to: if the PPDU is the SRG PPDU, determine whether to use SR based on the SR parameters, and if the PPDU is not determined to be the SRG PPDU, determine whether to use SR based on the non-SRG parameters; and if SR is determined to be used, encode a PPDU, and configure the HE station to begin to transmit the PPDU before the inter-BSS PPDU is finished being received by the HE STA.

Example 20 is a method performed by a wireless device, the method including: decoding a physical layer convergence procedure (PLCP) protocol data unit (PPDU); if the PPDU is an inter basic service set (BSS) PPDU and the PPDU comprises a BSS color, and a bit corresponding to a value of the BSS color of a spatial reuse group (SRG) BSS color bitmap is 1, determining the PPDU to be a SRG PPDU; and if the PPDU is the inter BSS PPDU and the PPDU comprises a BSS identification (ID) (BSSID), and a bit corresponding to a value of a partial BSSID of a SRG Partial BSSID Bitmap is 1, determining the PPDU to be the SRG PPDU.

In Example 21, the subject matter of Example 20 optionally includes where the value of the partial BSSID is a value of bits 39 through 44 of the BSSID, and where the BSS color bitmap is eight octets and the SRG partial BSSID bitmap is eight octets.

Example 22 is an apparatus of a high efficiency (HE) access point (AP) (HE AP) including: memory; and processing circuitry coupled to the memory, the processing circuitry configured to: encode a physical layer convergence procedure (PLCP) protocol data unit (PPDU) including a spatial reuse (SR) parameter set, where the spatial parameter set comprises a non SR group (SRG) overlapping basic service set (BSS) (OBSS) PD maximum offset, a SRG OBSS PD minimum offset, a SRG OBSS PD maximum offset, a SRG BSS color bitmap, and a SRG Partial BSSID Bitmap; and configure the HE AP to transmit the PPDU to one or more stations.

In Example 23, the subject matter of Example 22 optionally includes where the access point is a member of the SRG, and where the SRG BSS color bitmap indicates which BSS color values are used by additional HE APs and HE stations that are members of the SRG.

In Example 24, the subject matter of any one or more of Examples 22-23 optionally include where the SRG is one or more from the following group: BSSs in an extended service set (ESS), where the BSSs comprise access points and stations associated with the BSSs; and, access points and stations in a same management domain.

In Example 25, the subject matter of any one or more of Examples 22-24 optionally include transceiver circuitry coupled to the processing circuitry; and, one or more antennas coupled to the transceiver circuitry.

Example 26 is an apparatus of a high-efficiency (HE) station (STA) (HE STA) including: means for storing one or more bitmaps including at least one of a spatial reuse (SR) group (SRG) basic service set (BSS) color bitmap and a SRG Partial BSS identification (ID)(BSSID) Bitmap; means for decoding an inter-BSS physical layer convergence procedure (PLCP) protocol data unit (PPDU); means for determining the inter-BSS PPDU to be a SRG PPDU if: the inter-BSS PPDU comprises a BSS color field and a bit of the SRG BSS color bitmap corresponding to a value of the BSS color field is set; or a BSSID field is identified for the inter-BSS PPDU, and a bit of the SRG Partial BSSID bitmap corresponding to a value of a partial BSSID of the BSSID is set; if the inter-BSS PPDU is determined to be the SRG PPDU, means for determining SR parameters based on SRG parameters; and if the inter-BSS PPDU is not determined to be the SRG PPDU, means for determining SR parameters based on non-SRG parameters.

Example 27, the subject matter of Example 26 optionally includes to: means for determining the value of the partial BSSID to be a value of bits 39 through 44 of the BSSID.

In Example 28, the subject matter of any one or more of Examples 26-27 optionally include where the BSS color bitmap is eight octets and the SRG partial BSSID bitmap is eight octets.

In Example 29, the subject matter of any one or more of Examples 26-28 optionally include Means for decoding a spatial reuse parameter set, where the spatial parameter set comprises a non SRG overlapping BSS (OBSS) PD maximum offset, a SRG OBSS PD minimum offset, a SRG OBSS PD maximum offset, the SRG BSS color bitmap, and the SRG Partial BSSID Bitmap.

In Example 30, the subject matter of Example 29 optionally includes where the non-SRG parameters comprise the non SRG overlapping OBSS PD maximum offset, and the SRG parameters comprise the SRG OBSS PD minimum offset, and the SRG OBSS PD maximum.

In Example 31, the subject matter of any one or more of Examples 26-30 optionally include if the HE STA has not received a spatial reuse parameter set including the SRG BSS color bitmap or the SRG Partial BSSID) Bitmap, means for determining SR parameters based on non-SRG parameters.

In Example 32, the subject matter of any one or more of Examples 26-31 optionally include if the PPDU is the SRG PPDU, determine whether to use SR based on the SR parameters, and if the PPDU is not determined to be the SRG PPDU, means for determining whether to use SR based on the non-SRG parameters.

Example 33, the subject matter of Example 32 optionally includes if SR is determined to be used, means for encoding a PPDU, and configure the HE station to begin to transmit the PPDU before the inter-BSS PPDU is finished being received by the HE STA.

In Example 34, the subject matter of any one or more of Examples 26-33 optionally include means for decoding a PPDU; means for determining whether the PPDU is the inter-BSS PPDU; and if the PPDU is not the inter-BSS PPDU, means for determining not to perform SR.

In Example 35, the subject matter of any one or more of Examples 26-34 optionally include means for setting the bit corresponding to the value of the BSS color field of the SRG BSS color bitmap to a value of 1 to indicate the bit is set, and to the value of 0 to indicate the bit is not set; and means for setting the bit corresponding to the value of the partial BSSID of the SRG Partial BSSID Bitmap to the value of 1 to indicate the bit is set, and to the value of 0 to indicate the bit is not set.

In Example 36, the subject matter of any one or more of Examples 26-35 optionally include where a value of 1 indicates a bit is set and a value of 0 indicates a bit is not set.

In Example 37, the subject matter of any one or more of Examples 26-36 optionally include where a SRG is one or more from the following group: one or more BSSs in an extended service set (ESS); one or more BSSs and the access points and stations associated with the one or more BSSs; and, access points and stations in a same management domain, where the access points and stations are each one from the following group: an Institute of Electrical and Electronic Engineers (IEEE) 802.11ax access point, an IEEE 802.11ax station, an IEEE 802.11 station, and an IEEE 802.11 access point.

In Example 38, the subject matter of any one or more of Examples 26-37 optionally include where the SRG of the SRG PPDU is managed by a management entity.

In Example 39, the subject matter of any one or more of Examples 26-38 optionally include where the HE STA is one from the following group: an Institute of Electrical and Electronic Engineers (IEEE) 802.11ax access point, an IEEE 802.11ax station, an IEEE 802.11 station, and an IEEE 802.11 access point.

In Example 40, the subject matter of any one or more of Examples 26-39 optionally include means for transmitting and receiving radio frequency signals.

Example 41 is a non-transitory computer-readable storage medium that stores instructions for execution by one or more processors, the instructions to configure the one or more processors to cause a high efficiency (HE) access point (AP) (HE AP) to: encode a physical layer convergence procedure (PLCP) protocol data unit (PPDU) including a spatial reuse (SR) parameter set, where the spatial parameter set comprises a non SR group (SRG) overlapping basic service set (BSS) (OBSS) PD maximum offset, a SRG OBSS PD minimum offset, a SRG OBSS PD maximum offset, a SRG BSS color bitmap, and a SRG Partial BSSID Bitmap; and configure the HE AP to transmit the PPDU to one or more stations.

In Example 42, the subject matter of Example 41 optionally includes where the access point is a member of the SRG, and where the SRG BSS color bitmap indicates which BSS color values are used by additional HE APs and HE stations that are members of the SRG.

In Example 43, the subject matter of any one or more of Examples 41-42 optionally include where the SRG is one or more from the following group: BSSs in an extended service set (ESS), where the BSSs comprise access points and stations associated with the BSSs; and, access points and stations in a same management domain.

Example 44 is a method performed by a high efficiency (HE) access point (AP) (HE AP), the method including: encoding a physical layer convergence procedure (PLCP) protocol data unit (PPDU) including a spatial reuse (SR) parameter set, where the spatial parameter set comprises a non SR group (SRG) overlapping basic service set (BSS) (OBSS) PD maximum offset, a SRG OBSS PD minimum offset, a SRG OBSS PD maximum offset, a SRG BSS color bitmap, and a SRG Partial BSSID Bitmap; and configuring the HE AP to transmit the PPDU to one or more stations.

In Example 45, the subject matter of Example 44 optionally includes where the access point is a member of the SRG, and where the SRG BSS color bitmap indicates which BSS color values are used by additional HE APs and HE stations that are members of the SRG.

In Example 46, the subject matter of any one or more of Examples 41-45 optionally include where the SRG is one or more from the following group: BSSs in an extended service set (ESS), where the BSSs comprise access points and stations associated with the BSSs; and, access points and stations in a same management domain.

Example 47 is an apparatus of a high efficiency (HE) access point (AP) (HE AP), the method including: means for encoding a physical layer convergence procedure (PLCP) protocol data unit (PPDU) including a spatial reuse (SR) parameter set, where the spatial parameter set comprises a non SR group (SRG) overlapping basic service set (BSS) (OBSS) PD maximum offset, a SRG OBSS PD minimum offset, a SRG OBSS PD maximum offset, a SRG BSS color bitmap, and a SRG Partial BSSID Bitmap; and means for configuring the HE AP to transmit the PPDU to one or more stations.

In Example 48, the subject matter of Example 47 optionally includes where the access point is a member of the SRG, and where the SRG BSS color bitmap indicates which BSS color values are used by additional HE APs and HE stations that are members of the SRG.

In Example 49, the subject matter of any one or more of Examples 47-48 optionally include where the SRG is one or more from the following group: BSSs in an extended service set (ESS), where the BSSs comprise access points and stations associated with the BSSs; and, access points and stations in a same management domain.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station (STA) (HE STA) comprising: memory configured to store one or more bitmaps including at least one of a spatial reuse (SR) group (SRG) basic service set (BSS) color bitmap and a SRG Partial BSS identification (ID)(BSSID) Bitmap; and processing circuitry, configured to:
   decode an inter-BSS physical layer convergence procedure (PLCP) protocol data unit (PPDU);
   determine the inter-BSS PPDU to be a SRG PPDU if:
   the inter-BSS PPDU comprises a BSS color field and a bit of the SRG BSS color bitmap corresponding to a value of the BSS color field is set; or
   a BSSID field is identified for the inter-BSS PPDU, and a bit of the SRG Partial BSSID bitmap corresponding to a value of a partial BSSID of the BSSID is set;
   if the inter-BSS PPDU is determined to be the SRG PPDU, determine SR parameters based on SRG parameters;
   if the inter-BSS PPDU is not determined to be the SRG PPDU, determine SR parameters based on non-SRG parameters;
   determine whether to use SR based on the SR parameters; and
   if SR is determined to be used, encode a PPDU, and configure the HE station to begin to transmit the PPDU before the inter-BSS PPDU is finished being received by the HE STA.

2. The apparatus of claim 1, wherein the processing circuitry is further configured to:
   determine the value of the partial BSSID to be a value of bits 39 through 44 of the identified BSSID.

3. The apparatus of claim 1, wherein the BSS color bitmap is eight octets and the SRG partial BSSID bitmap is eight octets.

4. The apparatus of claim 1, wherein the processing circuitry is configured to:
   decode a spatial reuse parameter set, wherein the spatial reuse parameter set comprises a non SRG overlapping BSS (OBSS) power detect (PD) maximum offset, a SRG OBSS PD minimum offset, a SRG OBSS PD maximum offset, the SRG BSS color bitmap, and the SRG Partial BSSID Bitmap.

5. The apparatus of claim 4, wherein the non-SRG parameters comprise the non SRG overlapping OBSS PD maximum offset, and the SRG parameters comprise the SRG OBSS PD minimum offset, and the SRG OBSS PD maximum.

6. The apparatus of claim 1, wherein the processing circuitry is further configured to:
if the HE STA has not received a spatial reuse parameter set comprising the SRG BSS color bitmap or the SRG Partial BSSID) Bitmap, determine SR parameters based on non-SRG parameters.

7. The apparatus of claim 1, wherein the processing circuitry is further configured to:
decode another PPDU;
determine whether the another PPDU is a second inter-BSS PPDU; and
if the another PPDU is not the second inter-BSS PPDU, determine not to perform SR.

8. The apparatus of claim 1, wherein the processing circuitry is further configured to:
set the bit corresponding to the value of the BSS color field of the SRG BSS color bitmap to a value of 1 to indicate the bit is set, and to the value of 0 to indicate the bit is not set; and
set the bit corresponding to the value of the partial BSSID of the SRG Partial BSSID Bitmap to the value of 1 to indicate the bit is set, and to the value of 0 to indicate the bit is not set.

9. The apparatus of claim 1, wherein a value of 1 indicates a bit is set and a value of 0 indicates a bit is not set.

10. The apparatus of claim 1, wherein a SRG is one or more from the following group: one or more BSSs in an extended service set (ESS); one or more BSSs, and the access points and stations associated with the one or more BSSs; and, access points and stations in a same management domain, wherein the access points and stations are each one from the following group: an Institute of Electrical and Electronic Engineers (IEEE) 802.11ax access point, an IEEE 802.11ax station, an IEEE 802.11 station, and an IEEE 802.11 access point.

11. The apparatus of claim 1, wherein the processing circuitry is further configured to:
determine the value of the partial BSSID to be a value of one or more bits of the BSSID.

12. The apparatus of claim 1, wherein the HE STA is one from the following group: an Institute of Electrical and Electronic Engineers (IEEE) 802.11ax access point, an IEEE 802.11ax station, an IEEE 802.11 station, and an IEEE 802.11 access point.

13. The apparatus of claim 1, further comprising transceiver circuitry coupled to the processing circuitry; and, one or more antennas coupled to the transceiver circuitry.

14. A non-transitory computer-readable storage medium that stores instructions for execution by one or more processors, the instructions to configure the one or more processors to cause a high-efficiency (HE) station (STA) to:
decode a physical layer convergence procedure (PLCP) protocol data unit (PPDU);
if the PPDU is an inter basic service set (BSS) PPDU and the PPDU comprises a BSS color field, and if a SRG BSS color data structure indicates a value of the BSS color field is a member of a same SRG as the HE STA, determine the PPDU to be the SRG PPDU; and
if the PPDU is the inter BSS PPDU and the PPDU comprises a BSS identification (ID) (BSSID), and a SRG BSSID data structure indicates the BSSID is a member of the same SRG as the HE STA, determine the PPDU to be the SRG PPDU;
if the PPDU is the SRG PPDU, determine whether to use SR based on the SR parameters, and if the PPDU is not determined to be the SRG PPDU, determine whether to use SR based on the non-SRG parameters; and
if SR is determined to be used, encode a PPDU, and configure the HE station to begin to transmit the PPDU before the inter-BSS PPDU is finished being received by the HE STA.

15. The non-transitory computer-readable storage medium of claim 14, wherein the instructions further configure the one or more processors to cause the HE STA to:
if the PPDU is not determined to be the SRG PPDU, determine whether to use SR based on a default spatial reuse parameter set; and if the PPDU is determined to be the SRG PPDU, determine whether to use SR based on a SRG spatial reuse parameter set.

16. The non-transitory computer-readable storage medium of claim 14, wherein the instructions further configure the one or more processors to cause the HE STA to:
if the PPDU is the inter-BSS PPDU, and the PPDU comprises the BSS color field, and if a bit corresponding to the value of the BSS color field of a SRG BSS color bitmap is 1, determine the inter-BSS PPDU to be the SRG PPDU.

17. A method performed by a wireless device, the method comprising:
decoding a physical layer convergence procedure (PLCP) protocol data unit (PPDU);
if the PPDU is an inter basic service set (BSS) PPDU and the PPDU comprises a BSS color, and a bit corresponding to a value of the BSS color of a spatial reuse group (SRG) BSS color bitmap is 1, determining the PPDU to be a SRG PPDU; and
if the PPDU is the inter BSS PPDU and the PPDU comprises a BSS identification (ID) (BSSID), and a bit corresponding to a value of a partial BSSID of a SRG Partial BSSID Bitmap is 1, determining the PPDU to be the SRG PPDU;
if the PPDU is the SRG PPDU, determining whether to use SR based on the SR parameters, and if the PPDU is not determined to be the SRG PPDU, determine whether to use SR based on the non-SRG parameters; and
if SR is determined to be used, encoding a PPDU, and configuring the HE station to begin to transmit the PPDU before the inter-BSS PPDU is finished being received by the HE STA.

18. The method of claim 17, wherein the value of the partial BSSID is a value of bits 39 through 44 of the BSSID, and wherein the BSS color bitmap is eight octets and the SRG partial BSSID bitmap is eight octets.

19. An apparatus of a high efficiency (HE) access point (AP) (HE AP) comprising: memory; and processing circuitry coupled to the memory, the processing circuitry configured to:
encode a physical layer convergence procedure (PLCP) protocol data unit (PPDU) comprising a spatial reuse (SR) parameter set, wherein the spatial parameter set comprises a non SR group (SRG) overlapping basic service set (BSS) (OBSS) power detect (PD) maximum offset, a SRG OBSS PD minimum offset, a SRG OBSS PD maximum offset, a SRG BSS color bitmap, and a SRG Partial BSSID Bitmap; and
configure the HE AP to transmit the PPDU to one or more stations.

20. The apparatus of claim 19, wherein the access point is a member of the SRG, and wherein the SRG BSS color bitmap indicates which BSS color values are used by additional HE APs and HE stations that are members of the SRG.

21. The apparatus of claim 19, wherein the SRG is one or more from the following group: BSSs in an extended service set (ESS), wherein the BSSs comprise access points and stations associated with the BSSs; and, access points and stations in a same management domain.

22. The apparatus of claim 19, further comprising transceiver circuitry coupled to the processing circuitry; and, one or more antennas coupled to the transceiver circuitry.

* * * * *